US010623969B2

(12) United States Patent
Lin et al.

(10) Patent No.: US 10,623,969 B2
(45) Date of Patent: Apr. 14, 2020

(54) MEASURING AND SENDING METHOD, APPARATUS AND SYSTEM FOR INTERFERENCE COORDINATION

(71) Applicant: HUAWEI TECHNOLOGIES CO., LTD., Shenzhen (CN)

(72) Inventors: Bo Lin, Beijing (CN); Li Chai, Beijing (CN); Jie Shi, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/852,177

(22) Filed: Mar. 28, 2013

(65) Prior Publication Data

US 2013/0267230 A1  Oct. 10, 2013

Related U.S. Application Data

(63) Continuation of application No. PCT/CN2011/074992, filed on May 31, 2011.

(30) Foreign Application Priority Data

Sep. 30, 2010 (CN) .......................... 2010 1 0298597

(51) Int. Cl.
*H04W 36/00* (2009.01)
*H04W 24/02* (2009.01)
*H04W 24/10* (2009.01)

(52) U.S. Cl.
CPC ........... *H04W 24/02* (2013.01); *H04W 24/10* (2013.01)

(58) Field of Classification Search
CPC ..... H04W 16/00; H04W 16/02; H04W 36/00; H04W 36/08; H04W 36/36; H04W 36/30;
(Continued)

(56) References Cited

U.S. PATENT DOCUMENTS

2007/0004423 A1   1/2007 Gerlach et al.
2007/0218840 A1*  9/2007 Gerlach ................ H04W 16/02
                                                          455/63.2
(Continued)

FOREIGN PATENT DOCUMENTS

CN          1882154 A    12/2006
CN        101420746 A     4/2009
(Continued)

OTHER PUBLICATIONS

International Search Report, dated Sep. 8, 2011, in corresponding International Application No. PCT/CN2011/074992 (4 pp.).
(Continued)

*Primary Examiner* — Shantell L Heiber
(74) *Attorney, Agent, or Firm* — Leydig, Voit & Mayer, Ltd.

(57) ABSTRACT

A measurement method, a sending method, a measurement apparatus, and a sending system for interference coordination are disclosed. The measurement method includes: obtaining measurement configuration information, and obtaining measurement resource information for restrictive measurement; performing measurement according to the measurement configuration information and the measurement resource information for restrictive measurement, and obtaining a measurement result; and reporting the measurement result. Therefore, the interfered UE can perform measurement accurately and report the measurement result as a basis of handover.

8 Claims, 12 Drawing Sheets

(58) Field of Classification Search
CPC .......... H04W 4/02; H04W 64/00; G01S 5/14; H04L 29/08657

See application file for complete search history.

(56) References Cited

U.S. PATENT DOCUMENTS

| | | | |
|---|---|---|---|
| 2008/0268833 A1* | 10/2008 | Huang et al. ................. | 455/425 |
| 2009/0175179 A1* | 7/2009 | Stewart ............... | H04L 27/2613 |
| | | | 370/252 |
| 2009/0264077 A1 | 10/2009 | Damnjanovic | |
| 2010/0002650 A1* | 1/2010 | Ahluwalia ............ | H04L 1/1874 |
| | | | 370/331 |
| 2010/0003986 A1* | 1/2010 | Chen ................. | H04W 36/0088 |
| | | | 455/436 |
| 2010/0008282 A1 | 1/2010 | Bhattad et al. | |
| 2010/0008295 A1 | 1/2010 | Ji et al. | |
| 2010/0014429 A1* | 1/2010 | Kim et al. ................... | 370/241 |
| 2010/0151873 A1 | 6/2010 | Gorokhov et al. | |
| 2010/0322227 A1* | 12/2010 | Luo ................................ | 370/345 |
| 2011/0201279 A1* | 8/2011 | Suzuki ................. | H04W 24/10 |
| | | | 455/67.11 |
| 2012/0020230 A1 | 1/2012 | Chen et al. ..................... | 370/252 |
| 2012/0238263 A1* | 9/2012 | Caretti ................. | H04W 16/10 |
| | | | 455/426.1 |
| 2013/0028138 A1 | 1/2013 | Hao et al. | |
| 2013/0033998 A1 | 2/2013 | Seo et al. ....................... | 370/252 |
| 2013/0115968 A1* | 5/2013 | Wegmann ............. | H04W 16/10 |
| | | | 455/452.1 |
| 2013/0229933 A1 | 9/2013 | Ji et al. .......... | 370/252 |
| 2013/0303157 A1 | 11/2013 | Tao ............... | 455/423 |

FOREIGN PATENT DOCUMENTS

| | | |
|---|---|---|
| CN | 101541088 A | 9/2009 |
| CN | 101631351 A | 1/2010 |
| CN | 101772118 A | 7/2010 |
| CN | 101808409 A | 8/2010 |
| EP | 1838123 A1 | 9/2007 |
| JP | 2007-208784 A | 8/2007 |
| JP | 2012-531170 A | 12/2012 |
| JP | 2013-517707 A | 5/2013 |
| JP | 2013-524616 A | 6/2013 |
| JP | 2013-526155 A | 6/2013 |
| WO | WO 2008/120159 A2 | 10/2008 |
| WO | 2009/039473 A2 | 3/2009 |
| WO | 2009/070928 A1 | 6/2009 |
| WO | WO 2009/129413 A2 | 10/2009 |
| WO | WO 2010/047627 A1 | 4/2010 |

OTHER PUBLICATIONS

Extended European Search Report dated Sep. 5, 2013 in corresponding European Application No. 11789206.7.

International Search Report dated Sep. 8, 2011 for corresponding International Application No. PCT/CN2011/074992.

Written Opinion of the International Searching Authority dated Sep. 8, 2011 for corresponding International Application No. PCT/CN2011/074992.

3GPP™, "3$^{rd}$ Generation Partnership Project; Technical Specification Group Radio Access Network; Evolved Universal Terrestrial Radio Access network (E-UTRAN); X2 application protocol (X2AP) (Release 9)", 3GPP TS 36.423, V. 9.4.0, Sep. 2010, pp. 1-121.

3GPP™, "3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description Stage 2 (Release 10)", 3GPP TS 36.300, V10.1.0, Sep. 2010, pp. 1-192.

3GPP™, "3$^{rd}$ Generation Partnership Project; Technical Specification Group Radio Access Network; Evolved Universal Terrestrial Radio Access (E-UTRA); Radio Resource Control (RRC); Protocol specification (Release 9)", 3GPP TS 36.331, V9.4.0, Sep. 2010, pp. 1-252.

3GPP R1-104513. *Link adaptation of TDM/FDM eICIC and the necessity of resource-specific CQI measurement.* Huawei. Document for: Discussion and Decision: 3GPP TSG RAN WG1 meeting #62: Madrid, Spain, Aug. 23-27, 2010.

Japanese Office Action dated Jan. 7, 2014, in corresponding Japanese Patent Application No. 2013-530538.

Japanese Notice of Allowance dated Feb. 17, 2015 in corresponding Japanese Patent Application No. 2013-530538.

Dahlman et al., "3G Evolution: HSPA and LTE for Mobile Broadband", Second edition, Dec. 2009, 3 pp. (English Translation: 485 pp.).

Onoe et al., "Core of Wireless Broadband—Super3G (last part)—Proposing Different Communication System for Uplink and Downlink New Network Architecture Is Taking Shape", Nikkei Communications, Dec. 2005, 7 pp. (English Translation: 1 page).

Chinese Search Report dated Nov. 8, 2013 in corresponding Chinese Patent Application No. 201310182501.1.

Chinese Office Action dated Nov. 29, 2013 in corresponding Chinese Patent Application No. 201310182501.1.

* cited by examiner

MEASURING AND SENDING METHOD, APPARATUS AND SYSTEM FOR INTERFERENCE COORDINATION

CROSS-REFERENCE TO RELATED APPLICATIONS

This application is a continuation of International Application No. PCT/CN2011/074992, filed on May 31, 2011, which claims priority to Chinese Patent Application No. 201010298597.4, filed on Sep. 30, 2010, both of which are hereby incorporated by reference in their entireties.

FIELD OF THE INVENTION

The present invention relates to wireless communication technologies, and in particular, to a measuring and sending method, an apparatus, and a system for interference coordination.

BACKGROUND OF THE INVENTION

To enhance performance of a wireless communication network (including coverage, average throughput of a cell, cell edge throughput, and uplink/downlink spectrum utilization ratio), base stations of different transmitting power or different access types may be deployed in the same coverage area to form heterogeneous and multi-layer coverage. For example, in a LTE (Long Term Evolution, Long Term Evolution) system, a heterogeneous network made up of a macro base station (such as macro eNodeB) and a low-power base station (an access point such as Home eNodeB, micro eNodeB, pico eNodeB, Relay eNodeB, and RRH) is designed to enhance hotspot coverage, indoor dead zone (or weak zone) coverage, and cell edge coverage of macro base station in the area covered by the macro base station and to enhance average throughput of the cell, cell edge throughput, uplink/downlink spectrum utilization ratio of the cell, and to reduce network cost and Capital Expenditure (CAPEX, generally referring to investment in the form of funds and fixed assets) of the operator.

With increase of complexity of network deployment, interference is severer, and the existing interference management technologies are challenged. Some low-power base stations do not establish signaling interface to the macro network, and are unable to perform interference coordination by using the ICIC (Inter-Cell Interference Coordination, Inter-Cell Interference Coordination) technology between base stations. Besides, the signaling involved in the ICIC brings signaling load to the interfaces between base stations. In the prior art, no technology is available for measuring restricted resource. When an eNB (evolved NodeB, evolved NodeB) sends a RRC (Radio Resource Control, Radio Resource Control) reconfiguration message that carries measurement configuration to the UE (User Equipment, User Equipment), the measurement configuration is based on mean values of measurement of CRS (Cell-specific Reference Signal, Cell-specific Reference Signal) calculated by the UE in the evaluation period. After receiving the message that carries the measurement configuration, the UE measures CRS based on a subframe at intervals in the evaluation period, and reports the result of measurement performed by use of unrestricted resource according to the rules in the configuration message.

At least the following problems are found in the prior art: When the UE suffers interference, the UE performs only unrestricted measurement (it is assumed that the quality of the measured cell is very low, and no cell better than the victim cell is available or the operator expects the UE to prefer the victim cell), obtains a result of the unrestricted measurement, and report the result. In this case, if the UE is located in the victim cell, the UE hands over futilely, or, if the UE in the victim cell measures only specific resource, the network is unable to perform interference coordination; if the UE is located in the aggressor cell, the UE in the aggressor cell has no opportunity to hand over to the victim cell, or, if the UE measures only specific resource, too many UEs hand over to the victim cell, which leads to congestion of the victim cell.

SUMMARY OF THE INVENTION

An embodiment of the present invention provides a measuring and sending method, an apparatus, and a system for interference coordination so that an interfered UE can perform measurement accurately and report the measurement result as a basis of handover.

As one aspect, an embodiment of the present invention provides a measurement method for interference coordination. The method includes: obtaining measurement configuration information, and obtaining measurement resource information for restrictive measurement; performing measurement according to the measurement configuration information and the measurement resource information for restrictive measurement, and obtaining a measurement result; and reporting the measurement result.

As another aspect, another embodiment of the present invention provides a sending method for interference coordination. The method includes: sending, by a base station of a victim cell, an enhanced ICIC (eICIC) request to a base station of an aggressor cell when the a base station of the victim cell suffers interference from the base station of the aggressor cell; and deciding, by the base station of the aggressor cell, subframe configuration information for eICIC applied between the base station of the victim cell and the base station of the aggressor cell, and sending the decided subframe configuration information as measurement resource information for restrictive measurement to the base station of the victim cell.

As another aspect, another embodiment of the present invention provides a measurement apparatus for interference coordination. The apparatus includes: an obtaining unit, configured to obtain measurement configuration information, and obtain measurement resource information for restrictive measurement; a measuring unit, configured to perform measurement according to the measurement configuration information and the measurement resource information for restrictive measurement, and obtain a measurement result; and a reporting unit, configured to report the measurement result.

As another aspect, another embodiment of the present invention provides a sending system for interference coordination. The system includes a base station of a victim cell, a base station of an aggressor cell. The base station of a victim cell is configured to send an eICIC request to the base station of an aggressor cell when the base station of the victim cell suffers interference from the base station of the aggressor cell; and the base station of the aggressor cell is configured to decide subframe configuration information for eICIC applied between the base station of the victim cell and the base station of the aggressor cell according to the eICIC request, and send the decided subframe configuration information as measurement resource information for restrictive measurement to the base station of the victim cell.

The foregoing technical solution brings the following benefits: The measurement configuration information and the measurement resource information for restrictive measurement are obtained, measurement is performed according to the measurement configuration information and the measurement resource information for restrictive measurement, and a measurement result is obtained and reported. Therefore, the interfered UE can perform measurement accurately, and report the measurement result as a basis handover.

BRIEF DESCRIPTION OF THE DRAWINGS

To make the technical solution of the present invention or the prior art clearer, the following outlines the accompanying drawings involved in the description of the embodiments of the present invention or the prior art. Apparently, the accompanying drawings outlined below are illustrative rather than exhaustive, and persons of ordinary skill in the art can derive other drawings from them without any creative effort.

DETAILED DESCRIPTION OF THE EMBODIMENTS

The following detailed description is given in conjunction with the accompanying drawings to provide a thorough understanding of the present invention. Evidently, the drawings and the detailed description are merely representative of particular embodiments of the present invention rather than all embodiments. All other embodiments, which can be derived by those skilled in the art from the embodiments given herein without any creative effort, shall fall within the scope of the present invention.

Figure 1:
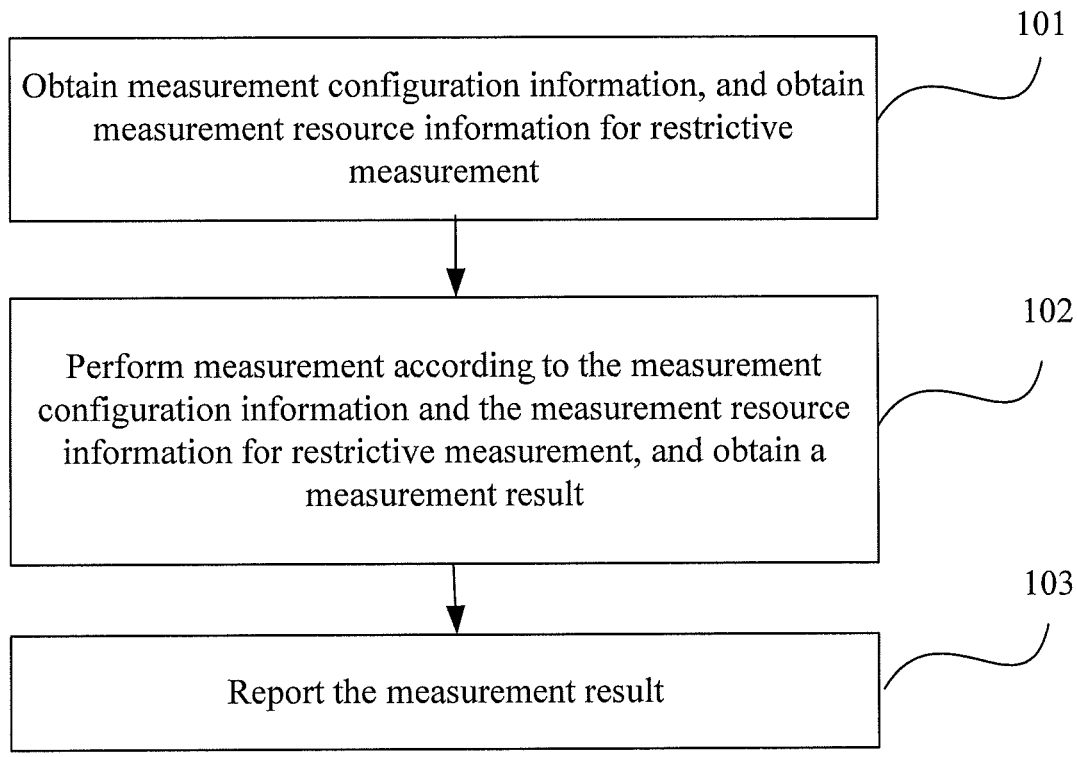
FIG. 1 is a flowchart of a measurement method for interference coordination according to an embodiment of the present invention.

FIG. 1 is a flowchart of a measurement method for interference coordination according to an embodiment of the present invention. The method includes the following steps:

101. Obtain measurement configuration information, and obtain measurement resource information for restrictive measurement.

102. Perform measurement according to the measurement configuration information and the measurement resource information for restrictive measurement, and obtain a measurement result.

103. Report the measurement result.

The reporting of the measurement result to the base station of the serving cell (that is base station of the serving cell in the description) includes: reporting the measurement result to the base station of the aggressor cell (that is a base station whose coverage cover the aggressor cell), and reporting the measurement result to the base station of the victim cell (that is a base station whose coverage cover the victim cell in the description).

Optionally, the obtaining the measurement resource information for restrictive measurement may include: The measurement resource information for restrictive measurement restricts the measured resource with respect to time domain, frequency domain, space domain, code domain; and the measurement resource information for restrictive measurement indicates resource used for ICIC or a subset of the resource used for ICIC, and is obtained through a broadcast message or a signaling. Optionally, the obtaining the measurement configuration information includes: obtaining configuration information for unrestrictive measurement, and a measurement indication of using specific resource corresponding to the measurement resource information for restrictive measurement and measurement indication for unrestrictive measurement to indicate to apply corresponding measuring type; configuration information for unrestrictive measurement, and measurement indication of using specific resource corresponding to the measurement resource information for restrictive measurement or measurement indication for unrestrictive measurement to indicate to apply corresponding measuring type; using a broadcast message or a signaling to obtain; where the measurement indication is an indication of starting, stopping. Optionally, the obtaining the measurement configuration information includes: obtaining configuration information for unrestrictive measurement, and a restrictive measurement indication and an unrestrictive measurement indication for handling a corresponding measurement type; configuration information for unrestrictive measurement, and a restrictive measurement indication or an unrestrictive measurement indication for handling a corresponding measurement type; using a broadcast message or a signaling; where the measurement indication is an indication of starting, stopping measurement. Optionally, a measurement type or an event type is used to identify the measurement result.

Optionally, an interference threshold may be obtained additionally when obtaining the measurement resource information for restrictive measurement through a broadcast message or a signaling. Optionally, the performing measurement according to the measurement configuration information and the measurement resource information for restrictive measurement, obtaining a measurement result, and reporting the measurement result includes: performing corresponding unrestrictive measurement according to the measurement configuration information, and obtaining an interference value representative of an interference level; comparing the interference value with the interference threshold; performing, by the UE, corresponding unrestrictive measurement according to the measurement configuration information, obtaining a measurement result of the unrestrictive measurement, and reporting the measurement result of the unrestrictive measurement to the base station of the serving cell if the interference value is greater than or equal to the interference threshold; initiating, by the UE, measurement of specific resource corresponding to the measurement resource information for restrictive measurement, and obtaining and reporting a measurement result of the specific resource according to the measurement resource information for restrictive measurement if the interference value is less than the interference threshold; or performing corresponding unrestrictive measurement and obtaining the result of the unrestrictive measurement, and meanwhile, measuring the specific resource corresponding to the measurement resource information for restrictive measurement and obtaining the result of the measurement of the specific resource, and reporting the result of the unrestrictive measurement and the result of measurement of the specific resource to the base station of the serving cell; or performing corresponding unrestrictive measurement and obtaining the result of the unrestrictive measurement, and meanwhile, measuring the specific resource corresponding to the measurement resource information for restrictive measurement and obtaining the result of the measurement of the specific resource, but reporting only the result of measurement of the specific resource to the base station of the serving cell until the interference value is greater than or equal to the interference threshold; and initiating restrictive measurement as soon as the UE receives the measurement resource information for restrictive measurement, and meanwhile, continuing the unrestrictive measurement.

Optionally, the obtaining the measurement configuration information and obtaining the measurement resource information for restrictive measurement includes: obtaining, by the UE located in the victim cell, the measurement configuration information from the base station of the victim cell, and obtaining the measurement resource information for restrictive measurement from the base station of the victim cell; or obtaining, by the UE in the aggressor cell, the measurement configuration information from the base station of the aggressor cell, obtaining the measurement resource information for restrictive measurement from the base station of the aggressor cell, and applying the measurement configuration information and measurement resource information to measure a neighboring victim cell.

Optionally, after receiving the reported measurement result, the base station of the aggressor cell decides to hand over to the base station of the victim cell according to the measurement result, and indicates a mode of scheduling the UE to the base station of the victim cell. The process of indicating of the scheduling mode is initiated by the base station of the aggressor cell, and the scheduling mode recommended by the UE is reported to the target base station of the victim cell. The base station of the victim cell that receives the indication takes this indication into account when formulating a scheduling policy for the UE handed in. For example, if the base station of the aggressor cell indicates restrictive resource scheduling, the base station of the victim cell may schedule the UE onto the restrictive resource used for ICIC. The indication of the scheduling mode is decided by the base station of the aggressor cell according to the type of the measurement result, where the type of measurement result is used for deciding handover to the base station of the victim cell, and is reported by the UE. The indication of the scheduling mode may be a separate signaling, or may be carried in a signaling transmitted in the handover process.

In the measurement method for interference coordination above, the interfered UE can perform measurement accurately and report the measurement result as a basis of handover.

Figure 2:
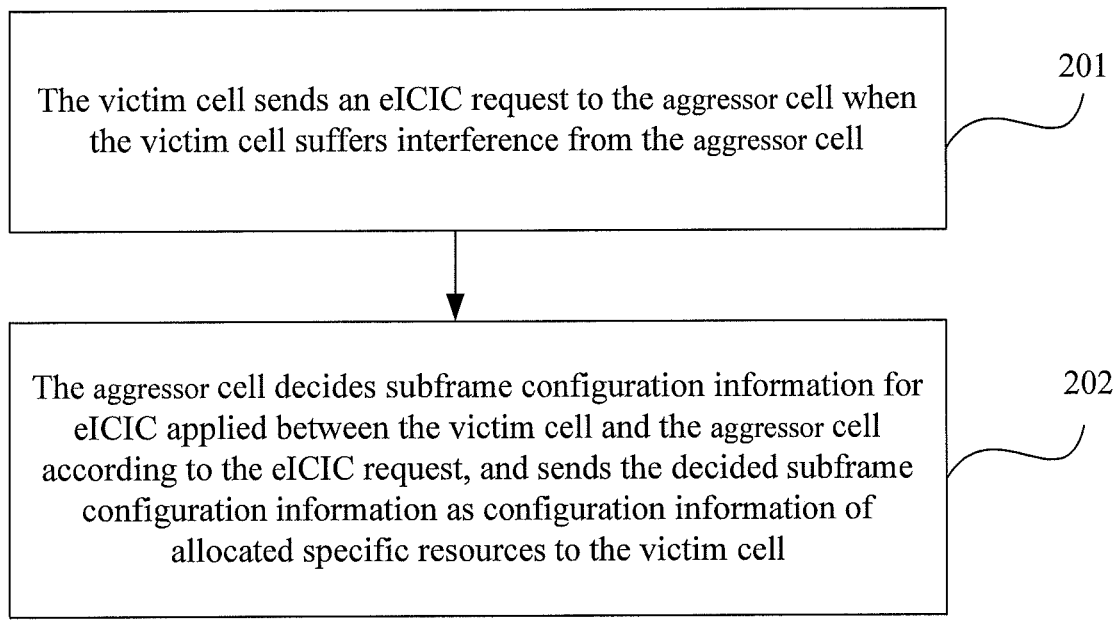
FIG. 2 is a flowchart of a sending method for interference coordination according to an embodiment of the present invention.

Corresponding to the foregoing measurement method, a sending method for interference coordination is provided in an embodiment of the present invention. As shown in FIG. 2, the sending method includes the following steps:

201. A base station of a victim cell sends an eICIC request to a base station of an aggressor cell when the base station of the victim cell suffers interference from the base station of the aggressor cell.

202. The base station of the aggressor cell determines subframe configuration information for eICIC applied between the base station of the victim cell and the base station of the aggressor cell according to the eICIC request, and sends the determined subframe configuration information as configuration information of allocated specific resource to the base station of the victim cell, and the base station of the victim cell configures the measurement resource information for restrictive measurement.

Optionally, before the base station of the victim cell sends the eICIC request to the base station of the aggressor cell, the method may further include: sending, by the base station of the aggressor cell, available subframe configuration information for eICIC to the base station of the victim cell. the determining by the base station of the aggressor cell, the subframe configuration information for eICIC applied between the base station of the victim cell and the base station of the aggressor cell according to the eICIC request, may include: The base station of the aggressor cell determines the subframe configuration information for eICIC applied between the base station of the victim cell and the base station of the aggressor cell, according to the subframe configuration information available to the base station of the aggressor cell for eICIC, and according to the eICIC subframe configuration information in the eICIC request. The determined subframe configuration information applied to eICIC includes completely silent subframe configuration information and partly silent subframe configuration information; or the UEs later than R10 are scheduled on such subframes selectively.

Optionally, before the base station of the victim cell sends the eICIC request to the base station of the aggressor cell, the method may further include: sending a message between the base station of the victim cell and the base station of the aggressor cell, where the message indicates local capability of whether supporting eICIC to the opposite party. If the base station of the aggressor cell supports ICIC, the base station of the victim cell sends an ICIC request upon detecting interference.

Optionally, after the base station of the victim cell receives the determined subframe configuration information applied to eICIC sent by the base station of the aggressor cell, the base station of the victim cell may send confirmed usable subframe configuration information for eICIC to the base station of the aggressor cell. The confirmation process aims to keep synchronization of use of radio resource. In some specific scenarios, if the base station of the victim cell fails to receive the configuration information sent by the base station of the aggressor cell, the base station of the aggressor cell is unaware of the configuration information for lack of the confirmation process, the base station of the victim cell does not use the configuration of the base station of the aggressor cell for failure of receiving the configuration, and the base station of the aggressor cell does not use the configuration which has been sent. The confirmation process improves the utilization ratio of radio resource.

Optionally, if detecting that a measured value in the measurement report submitted by the UE with respect to the base station of the aggressor cell exceeds a preset threshold, the base station of the victim cell confirms that the base station of the victim cell suffers interference from the base station of the aggressor cell. Optionally, the subframe configuration information, which is sent by the base station of the aggressor cell to the base station of the victim cell and is decided as being applied to eICIC, may further include time of starting to use subframe configuration. The time of starting to use subframe configuration is designed to coordinate time of using the subframe between the base station of the aggressor cell and the base station of the victim cell, for example, the base station of the victim cell schedules the UE into the subframe on which the base station of the aggressor cell is in a silent mode. Optionally, the eICIC request sent by the base station of the victim cell to the base station of the aggressor cell carries an indication of interference level. The interference level may be of a high, medium or low level. Depending on the interference level, the transmitting power or the number of silent subframes of the aggressor cell may be adjusted. For example, when the interference level is high, the transmitting power may be reduced, subframes may be made silent completely, or more subframes may be made silent to reduce interference.

In the sending method for interference coordination in the foregoing embodiment, the interfered UE can perform measurement accurately, and report the measurement result as a basis of handover. After receiving the measurement report, the base station of the aggressor cell decides to hand over to the base station of the victim cell. The handover command may optionally carry a notification to the base station of the victim cell. The notification indicates that the mode of scheduling the UE is an enhanced scheduling mode of eICIC (namely, the scheduling is performed only on the resource designed for interference coordination on the base station of the aggressor cell), or indicates that the measurement result serving as a basis of the decision derives from measurement of restrictive resource.

Figure 3:
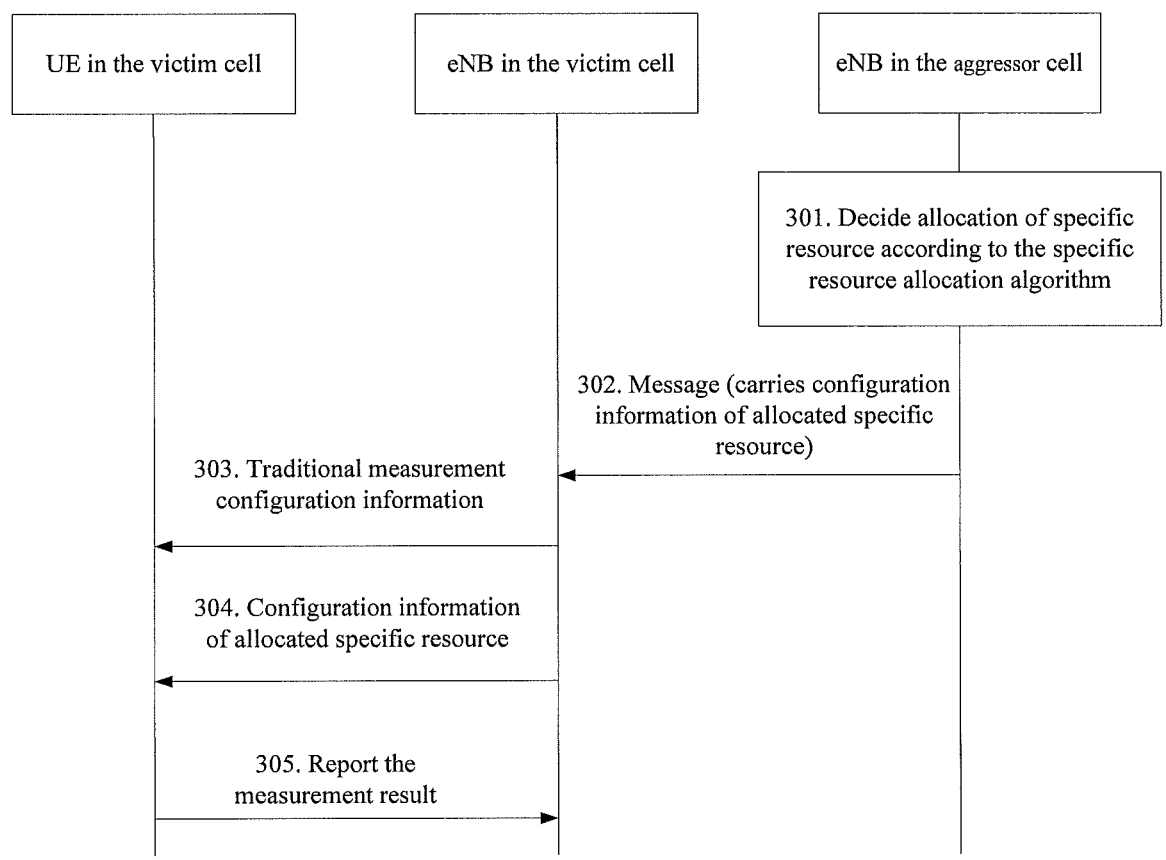
FIG. 3 is a signaling chart of how a UE in a victim cell reports a measurement result according to a first embodiment of the present invention.

The following gives more details through examples:

FIG. 3 is a signaling chart of how a UE in a victim cell reports a measurement result according to a first embodiment of the present invention. The signaling flow includes:

301. The eNB of the aggressor cell decides allocation of specific resource according to the specific resource allocation algorithm.

302. The eNB of the aggressor cell exchanges the configuration information of allocated specific resource with the eNB of the victim cell.

Figure 4A:
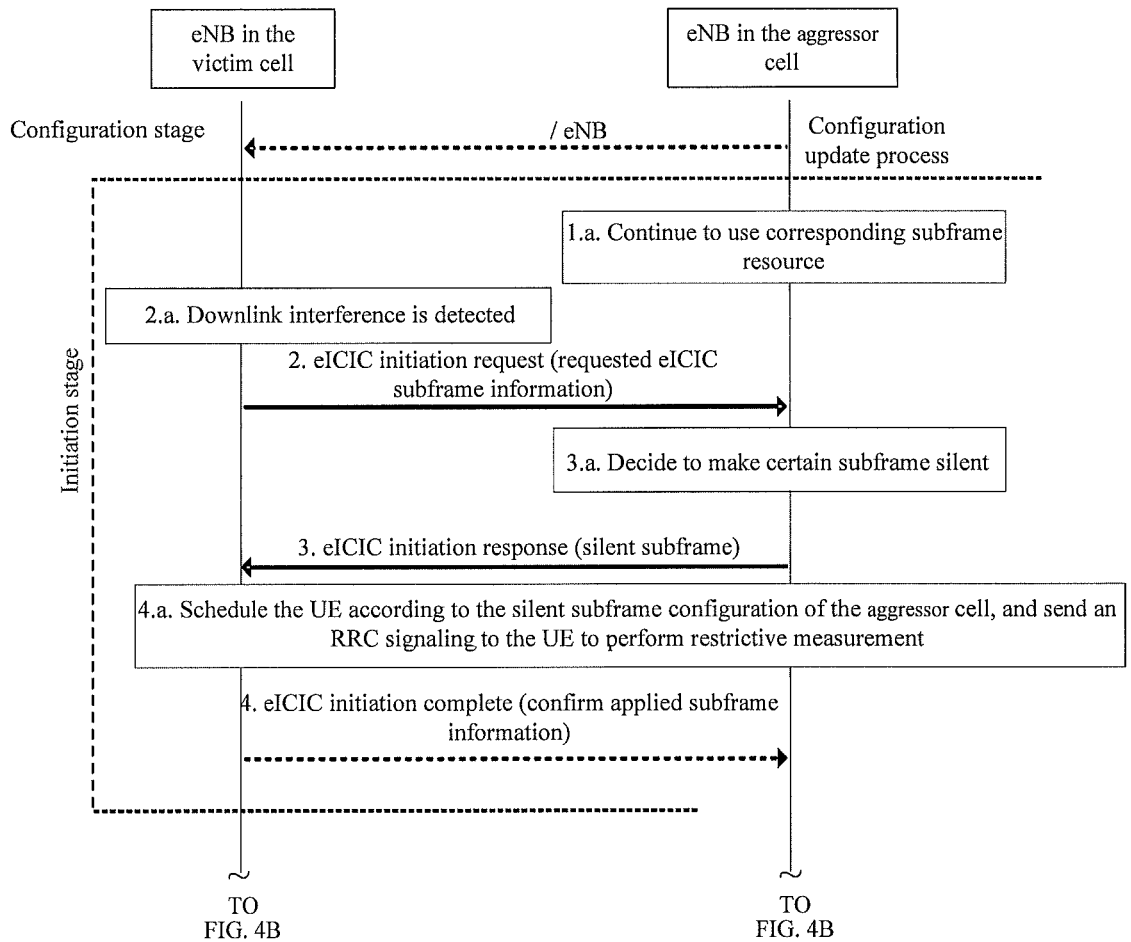
FIG. 4 (including FIG. 4A and FIG. 4B) is a signaling chart of resource interaction between an aggressor cell and a victim cell according to an embodiment of the present invention.
Figure 4B:
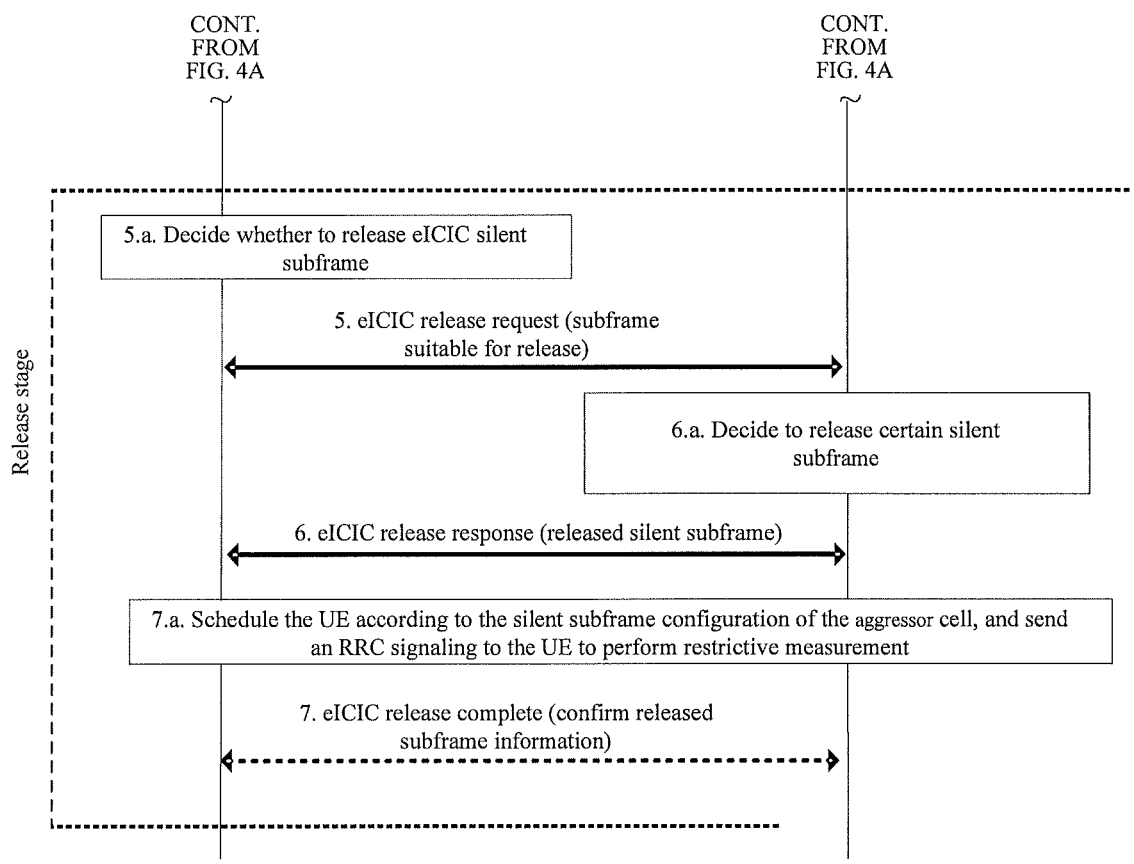

FIG. 4 is a signaling chart of resource interaction between an eNB of the aggressor cell and an eNB of the victim cell according to an embodiment of the present invention. The signaling flow includes:

Configuration Stage:

1: The eNB of the aggressor cell sends subframe configuration information (called configuration of available subframes) for eICIC (enhanced Inter-Cell Interference Coordination) available to TDM (Time Division Multiplex, Time Division Multiplex) to the eNB of the victim cell in the process of setting up the X2 interface or updating the eNB configuration. The subframe configuration information indicates that the eNB of the aggressor cell may make such subframes be silent for interference coordination to the eNB of the victim cell. In this embodiment, this configuration is not applied immediately, but is applied in step 2.

Initiation Stage:

1a: When the eNB of the victim cell suffers no interference, the eNB of the aggressor cell may go on using the corresponding subframe resource rather than be silent, thereby improving utilization ratio of the resource.

2a: The eNB of the victim cell obtains cell identifier through the measurement report of the UE, and decides to initiate an eICIC process to the eNB of the aggressor cell when detecting downlink interference imposed by the eNB of the aggressor cell onto the UE.

2: The eNB of the victim cell sends an eICIC initiation request message to the eNB of the aggressor cell. This message may carry eICIC subframe configuration information requested by the eNB of the victim cell.

The requested eICIC subframe configuration information may be a subset of the configuration of the available subframes indicated by the eNB of the aggressor cell in step 1, or a percentage of the configuration of the available subframes, or an indication of level of requested number of subframe resource. The main objective is: Depending on the number of interfered UEs in the eNB of the victim cell, service requirement of the interfered UE, QoS (Quality of Service, Quality of Service) requirement, the eNB of the victim cell may request to use different quantity of resource, and therefore, the occupied resource are not excessive, and resource are available to the interfered UE.

3.a: The eNB of the aggressor cell decides which subframes are silent. Specifically, the decision is made according to the local utilization of resource, load of the eNB of the local cell, load of the eNB of the victim cell, and resource requested by the eNB of the victim cell.

3: The eNB of the aggressor cell notifies the configuration information of the determined silent subframe to the eNB of the victim cell. Further, the configuration information may include time of starting to use the configuration, indicating specific time when the silent subframe will be used. The time is designed to keep synchronization of processing the silent subframes between the eNB of the aggressor cell and the eNB of the victim cell. The time information may be expressed by a specific subframe number.

4.a: The eNB of the victim cell schedules the interfered UE into the position of the corresponding silent subframe.

4(optional): The eNB of the victim cell sends an eICIC initiation complete message to the eNB of the aggressor cell. Through this message, the eNB of the aggressor cell knows that the eNB of the victim cell accepts the configuration of the silent subframes. After receiving the message, the eNB of the aggressor cell sends a measurement control message to the UE. The measurement control message specifies that only silent subframes need to be measured when the UE measures signals of the eNB of the neighboring victim cell. If this step is optional, the measurement control message is sent to the UE after step 3.a.

Release Stage:

5.a: The eNB of the victim cell decides that it is not necessary to go on with the eICIC, or decides that some silent subframes can be released.

5: The eNB of the victim cell sends an eICIC release request message to the eNB of the aggressor cell. This message may carry subframe configuration information decided by the eNB of the victim cell for release. Corresponding to step 2, the information about the subframes to be released may be a subset of the configuration of the silent subframes indicated by the eNB of the aggressor cell in step 3, or a percentage of the configured available subframes, or an indication of level of requested number of subframe resource. The objective is: Depending on the number of interfered UEs in the eNB of the victim cell, service requirement of the interfered UE, Quality of Service (QoS) requirement, the eNB of the victim cell may use different number of resource, and therefore, the occupied resource are not excessive, and resource are available to the interfered UE.

6.*a*: The eNB of the aggressor cell decides which silent subframes will be released. A released subframe is available to the eNB of the aggressor cell. Specifically, the decision is made according to the local utilization of resource, load of the eNB of the local cell, load of the eNB of the victim cell, and resource requested by the eNB of the victim cell.

6: The eNB of the aggressor cell notifies the configuration information of the silent subframes decided for release to the eNB of the victim cell. Further, the configuration information may include effective time, indicating specific time when the release of the silent subframe will take effect. The effective time is designed to keep synchronization of processing the silent subframes between the eNB of the aggressor cell and the eNB of the victim cell. The effective time information may be expressed by a specific subframe number.

7.*a*: The eNB of the victim cell schedules the interfered UE into the position of the corresponding silent subframe.

7(optional): The eNB of the victim cell sends an eICIC release complete message to the eNB of the aggressor cell. Through this message, the eNB of the victim cell knows that the eNB of the aggressor cell accepts the release of the silent subframes, and confirms configuration of possible remaining silent subframes. After receiving the message, the eNB of the aggressor cell sends a measurement control message to the UE. The measurement control message specifies that only silent subframes need to be measured when the UE measures signals of the eNB of the neighboring victim cell. If this step is optional, the measurement control message may be sent to the UE after step 6.

303. The eNB of the victim cell sends a configuration message that carries unrestrictive measurement configuration information to the UE.

304. The eNB of the victim cell sends to the UE a signaling that carries information about measurement resource of restrictive measurement of the eNB of the aggressor cell.

After the UE receives the foregoing message, RLM (Radio Link Measurement, Radio Link Measurement) of the UE or CSI (Channel Status Information, Channel Status Information) measurement is performed according to specified resource block of specific resource. For RRM measurement (Radio Resource Management, Radio Resource Management) (RSRP (Reference Signal Received Power, Reference Signal Received Power)/RSRQ (Reference Signal Received Quality, Reference Signal Received Quality)), the UE performs only corresponding restrictive measurement according to the information about measurement resource of restrictive measurement, or performs measurement according to specified resource block of specific resource and performs existing unrestrictive measurement.

305. The UE reports the measurement result.

The UE reports only the measurement result of the measurement performed according to the specified resource block of specific resource. The measurement result may be identified by measurement type, or the measurement performed according to specified resource block of specific resource is identified by a new event type; or the UE reports the result of measurement performed according to specified resource block of specific resource and the result of unrestrictive measurement.

In this embodiment, the UE in the eNB of the victim cell reports the measurement result as a basis of handover; after receiving the measurement report from the UE, the eNB of the aggressor cell decides handover to the eNB of the victim cell.

Figure 5:
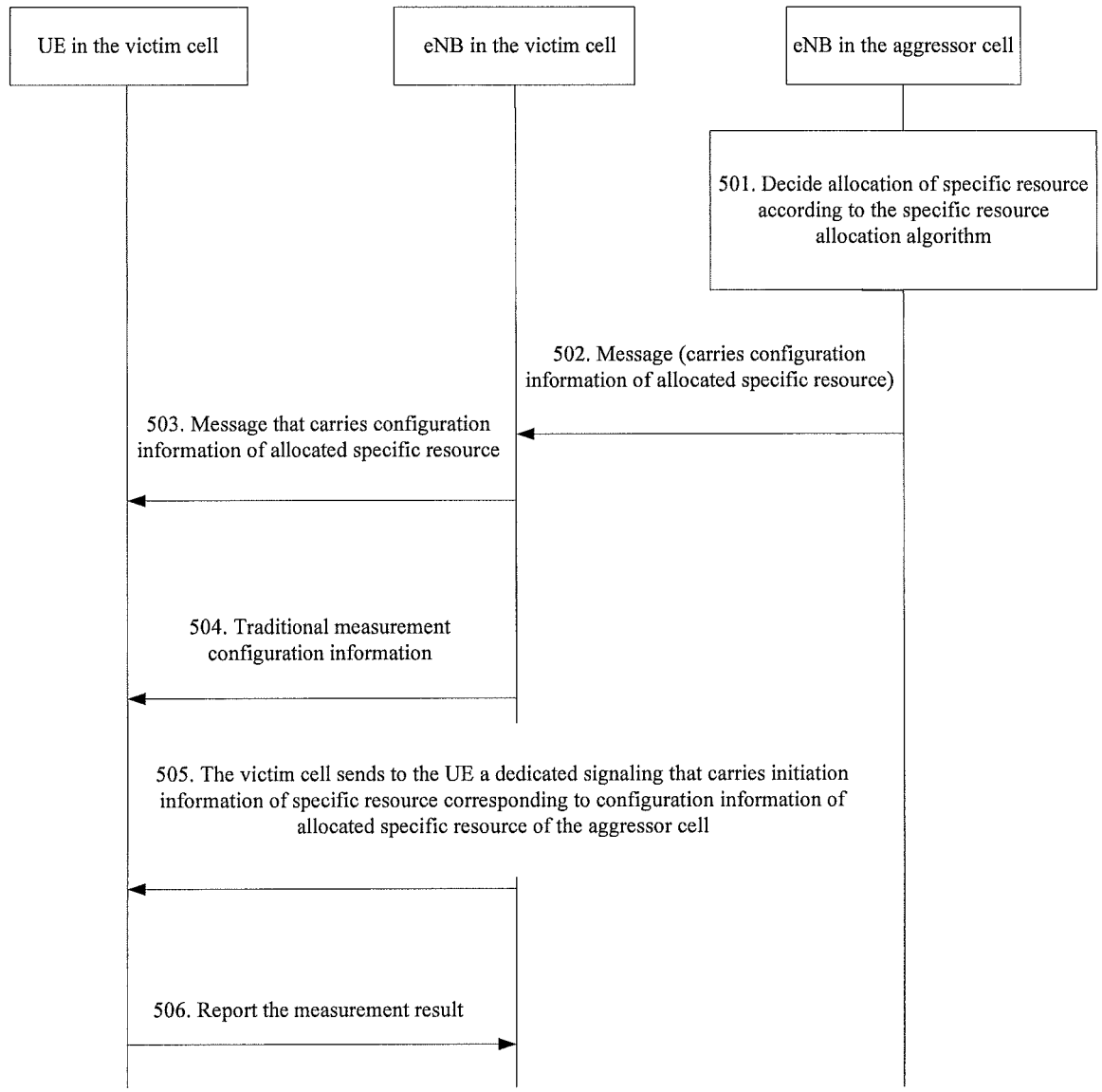
FIG. 5 is a signaling chart of how a UE in a victim cell reports a measurement result according to a second embodiment of the present invention.

FIG. 5 is a signaling chart of how a UE in an eNB of a victim cell reports a measurement result according to a second embodiment of the present invention. The signaling flow includes:

501. The eNB of the aggressor cell decides allocation of specific resource according to the specific resource allocation algorithm.

502. The eNB of the aggressor cell exchanges the configuration information of allocated specific resource with the eNB of the victim cell.

For details, see FIG. 4. The difference from the steps in the first embodiment is: In the release process, step 5 is initiated by the eNB of the aggressor cell rather than the eNB of the victim cell; step 6 is initiated by the eNB of the victim cell rather than the eNB of the aggressor cell; and step 7 is initiated by the eNB of the aggressor cell rather than the eNB of the victim cell.

5: The eNB of the aggressor cell sends an eICIC release request. Specifically, uplink interference from the interfered UE is detected so as to know whether an interfered UE exists. If the uplink interference is lower than a preset threshold, the eNB of the aggressor cell decides to send an eICIC release request. The release request may carry configuration information of silent subframes recommended for release, or configuration information of new recommended silent subframes to the eNB of the victim cell.

6(optional): The eNB of the victim cell sends an eICIC release confirmation message to the eNB of the aggressor cell. Further, the configuration of the silent subframes recommended in steps 2-5 is confirmed, for example, as regards whether to accept, which subframes are accepted, or which subframes are rejected.

7(optional): The eNB of the aggressor cell sends an eICIC release complete message to the eNB of the victim cell. In this way, the eNB of the victim cell knows which subframes are released.

503. The eNB of the victim cell configures measurement resource of restrictive measurement according to configuration information of specific resource allocated by the eNB of the aggressor cell or a subset of the configuration information, and sends a broadcast message that carries information about measurement resource of restrictive measurement to the UE.

504. The eNB of the victim cell sends the unrestrictive measurement configuration information to the UE.

505. The eNB of the victim cell sends measurement configuration information to the UE through a signaling. The measurement configuration information carries an indication of starting/stopping restrictive measurement, and an indication of starting/stopping unrestrictive measurement to perform corresponding measurement type; or carries an indication of starting/stopping restrictive measurement, or an indication of starting/stopping unrestrictive measurement to perform corresponding measurement type. By default, the UE performs only unrestrictive measurement.

For the UE that needs to perform measurement according to specified resource block of specific resource, the eNB of the victim cell sends a signaling to the UE as an indication of performing restrictive measurement.

As a step in place of step 505, configure the report type according to a measurement type indication included in the measurement configuration information unrestrictive measurement/restrictive measurement/both measurement or without the measurement type indication, meastype ENUMERATED {specificmeas, regularmeas, . . . , both}. By default, only unrestrictive measurement is performed.

If the signaling received by the UE indicates that both restrictive measurement and unrestrictive measurement are required, unrestrictive measurement and restrictive measurement according to specified resource block of specific resource are performed; if restrictive measurement is configured for the UE, the measurement of RLM/CSI of the UE is only the measurement corresponding to the restrictive measurement.

506. The UE reports the measurement result.

The UE reports only the measurement result of the measurement performed according to the specified resource block of specific resource. The measurement result may be identified by measurement type, or the measurement performed according to specified resource block of specific resource is identified by a new event type; or the UE reports the result of measurement performed according to specified resource block of specific resource and the result of unrestrictive measurement.

In this embodiment, a specific UE in the eNB of the victim cell performs measurement upon receiving an initiation indication, and reports the measurement result as a basis of handover; after receiving the measurement report from the UE, the eNB of the aggressor cell decides handover to the eNB of the victim cell.

Figure 6:
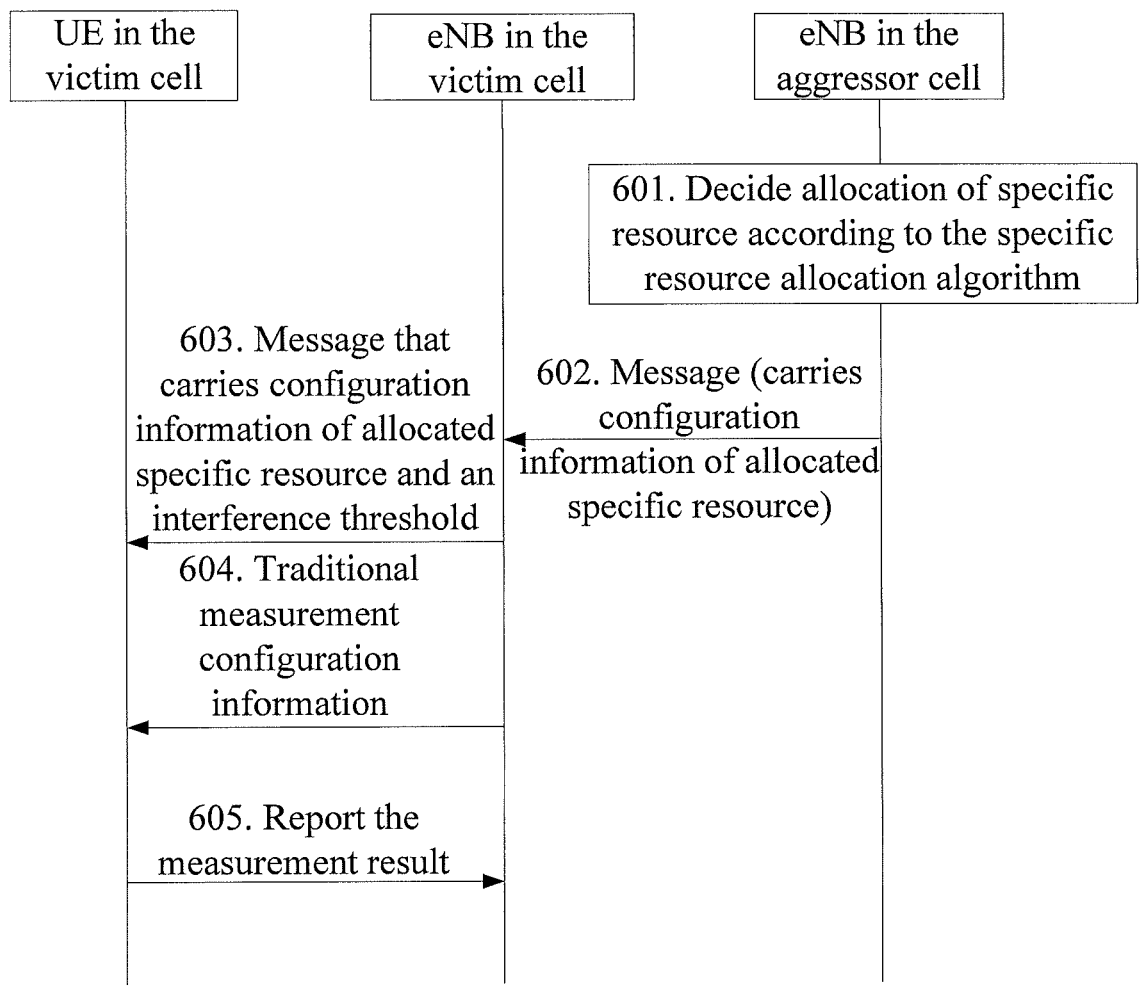
FIG. 6 is a signaling chart of how a UE in a victim cell reports a measurement result according to a third embodiment of the present invention.

FIG. 6 is a signaling chart of how a UE in a victim cell reports a measurement result according to a third embodiment of the present invention. The signaling flow includes:

601. The eNB of the aggressor cell decides allocation of specific resource according to the specific resource allocation algorithm.

602. The eNB of the aggressor cell exchanges the configuration information of allocated specific resource with the eNB of the victim cell.

For details, see FIG. 4. The difference from the steps in the first embodiment lies in step 1, step 4, step 6; and step 1 and step 6 are modified:

1,6: The eNB of the aggressor cell sends subframe configuration information (called configuration of available subframe) for eICIC (enhanced Inter-Cell Interference Coordination) to the eNB of the victim cell in the process of setting up the X2 interface or updating the eNB configuration. The subframe configuration information indicates that the eNB of the aggressor cell makes such subframes be silent. After receiving the subframe configuration information, the eNB of the victim cell schedules the UE into the position of the silent subframe.

If the eNB of the victim cell has received the eICIC subframe configuration information from the eNB of the aggressor cell previously, the previous configuration is ignored, and the latest configuration applies. Therefore, this process initiated by the eNB of the aggressor cell can start or release the eICIC (null configuration indicates release of the eICIC).

4: The eNB of the victim cell sends subframe configuration confirmation information for eICIC to the eNB of the aggressor cell. Therefore, the eNB of the aggressor cell knows that the eNB of the victim cell will initiate eICIC on such subframes.

603. The eNB of the victim cell configures measurement resource of restrictive measurement according to configuration information of specific resource allocated by the eNB of the aggressor cell or a subset of the configuration information, and sends a broadcast message that carries information about measurement resource of restrictive measurement to the UE. The broadcast message carries an interference threshold such as RSRQ-threshold.

604. The eNB of the victim cell sends the unrestrictive measurement configuration information to the UE.

When the UE reads the broadcast message, the restrictive resource configuration and the interference threshold continue to exist in the variables of the UE, and are updated after the restrictive resource configuration and the interference threshold is updated in the subsequent system message. The UE performs unrestrictive measurement to obtain a value representative of the interference level, for example, RSRQ-meas.

If the measured value "RSRQ-meas" is greater than or equal to the RSRQ-threshold, the UE still performs unrestrictive measurement.

If the measured value "RSRQ-meas" is less than the RSRQ-threshold, the RLM/CSI of the UE is measured according to the specified resource block of specific resource. For the RRM measurement (such as RSRP/RSRQ), the UE performs only corresponding measurement according to specified resource block of specific resource, or performs measurement according to specified resource block of specific resource and unrestrictive measurement.

605. The UE reports the measurement result.

The UE reports only the measurement result of the measurement performed according to the specified resource block of specific resource. The measurement result may be identified by measurement type, or the result of measurement performed according to specified resource block of specific resource is identified by a new event type; or the UE reports the result of measurement performed according to specified resource block of specific resource and the result of unrestrictive measurement.

Step 605' in place of the step 605: The UE reports the measurement result: The UE keeps on performing unrestrictive measurement. When the measured value RSRQ-meas is less than RSRQ-threshold, the UE performs measurement according to specified resource block of specific resource, and performs unrestrictive measurement. If the measured value RSRQ-meas is less than RSRQ-threshold, the UE reports only the result of the measurement performed according to specified resource block of specific resource; if the measured value RSRQ-meas is greater than or equal to RSRQ-threshold, the UE reports only the result of unrestrictive measurement. The measurement result may be identified by a measurement type.

In this embodiment, the UE in the eNB of the victim cell performs measurement by using an interference threshold, and reports the measurement result as a basis of handover; after receiving the measurement report from the UE, the eNB of the aggressor cell decides handover to the eNB of the victim cell.

Figure 7:
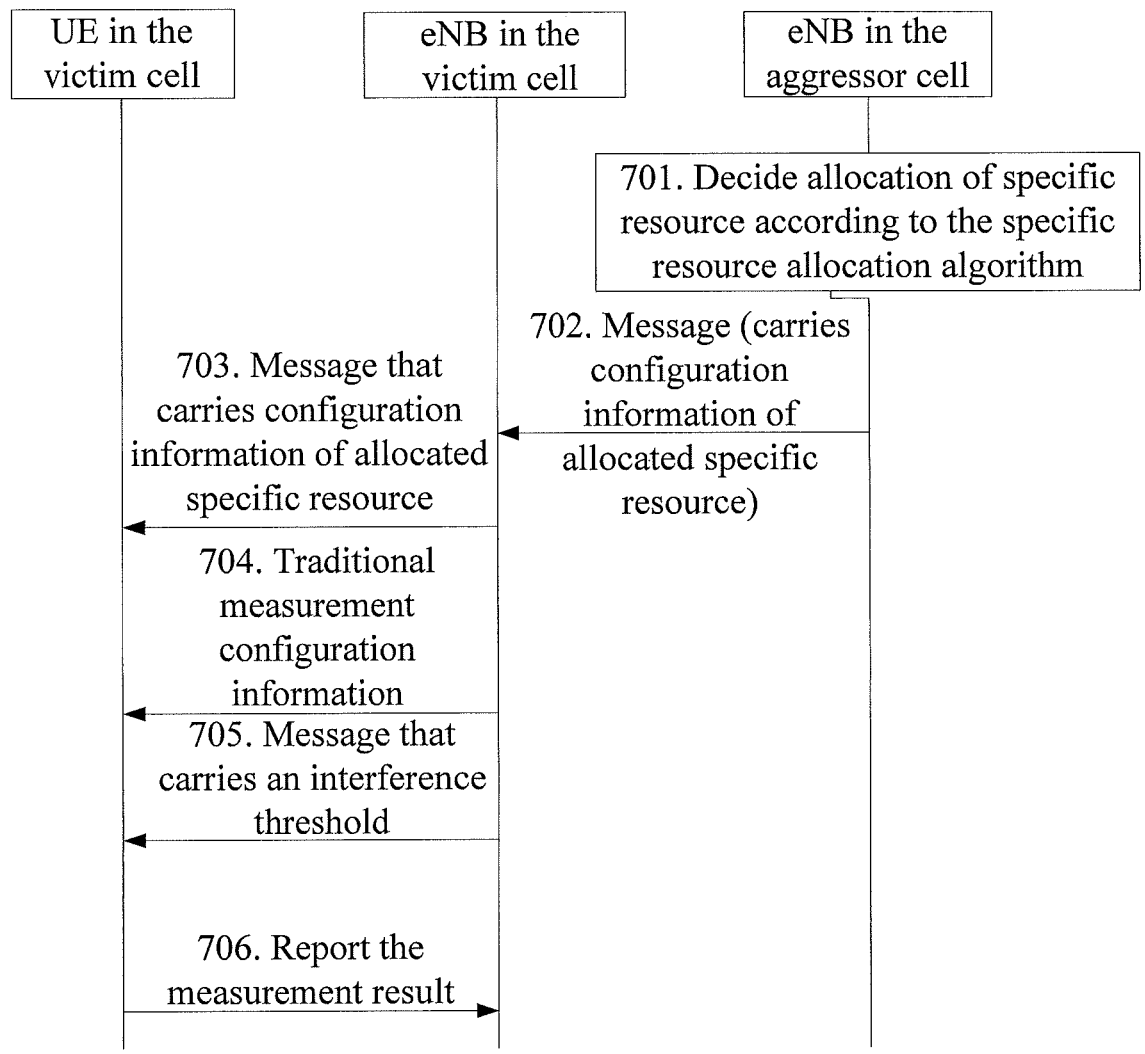
FIG. 7 is a signaling chart of how a UE in a victim cell reports a measurement result according to a fourth embodiment of the present invention.

FIG. 7 is a signaling chart of how a UE in an eNB of a victim cell reports a measurement result according to a fourth embodiment of the present invention. The signaling flow includes:

701. The eNB of the aggressor cell decides allocation of specific resource according to the specific resource allocation algorithm.

702. The eNB of the aggressor cell sends configuration information of allocated specific resource to the eNB of the victim cell.

703. The eNB of the victim cell configures measurement resource of restrictive measurement according to configuration information of specific resource allocated by the eNB of the aggressor cell or a subset of the configuration information, and sends a broadcast message that carries information about measurement resource of restrictive measurement to the UE.

704. The eNB of the victim cell sends the unrestrictive measurement configuration information to the UE.

When the UE reads the broadcast message, the restrictive resource configuration and the interference threshold continue to exist in the variables of the UE, and are updated after the restrictive resource configuration and the interference threshold is updated in the subsequent system message.

705. The UE receives a signaling that carries an interference threshold from the eNB of the victim cell, for example, carries an RSRQ-threshold.

The UE performs unrestrictive measurement, and obtains a value representative of the interference level, for example, RSRQ-meas.

If the measured value RSRQ-meas is greater than or equal to the RSRQ-threshold, the UE still performs unrestrictive measurement.

If the measured value RSRQ-meas is less than the RSRQ-threshold, the RLM/CSI of the UE is measured according to the specified resource block of specific resource. For the RRM measurement (such as RSRP/RSRQ), the UE performs only corresponding measurement according to specified resource block of specific resource, or performs measurement according to specified resource block of specific resource and unrestrictive measurement.

706. The UE reports the measurement result.

The UE reports only the measurement result of the measurement performed according to the specified resource block of specific resource. The measurement result may be identified by measurement type, or the result of measurement performed according to specified resource block of specific resource is identified by a new event type; or the UE reports the result of measurement performed according to specified resource block of specific resource and the result of unrestrictive measurement.

In this embodiment, a specific UE of the eNB of the victim cell performs measurement by using an interference threshold, and reports the measurement result as a basis of handover; after receiving the measurement report from the UE, the eNB of the aggressor cell decides handover to the eNB of the victim cell.

Figure 8:
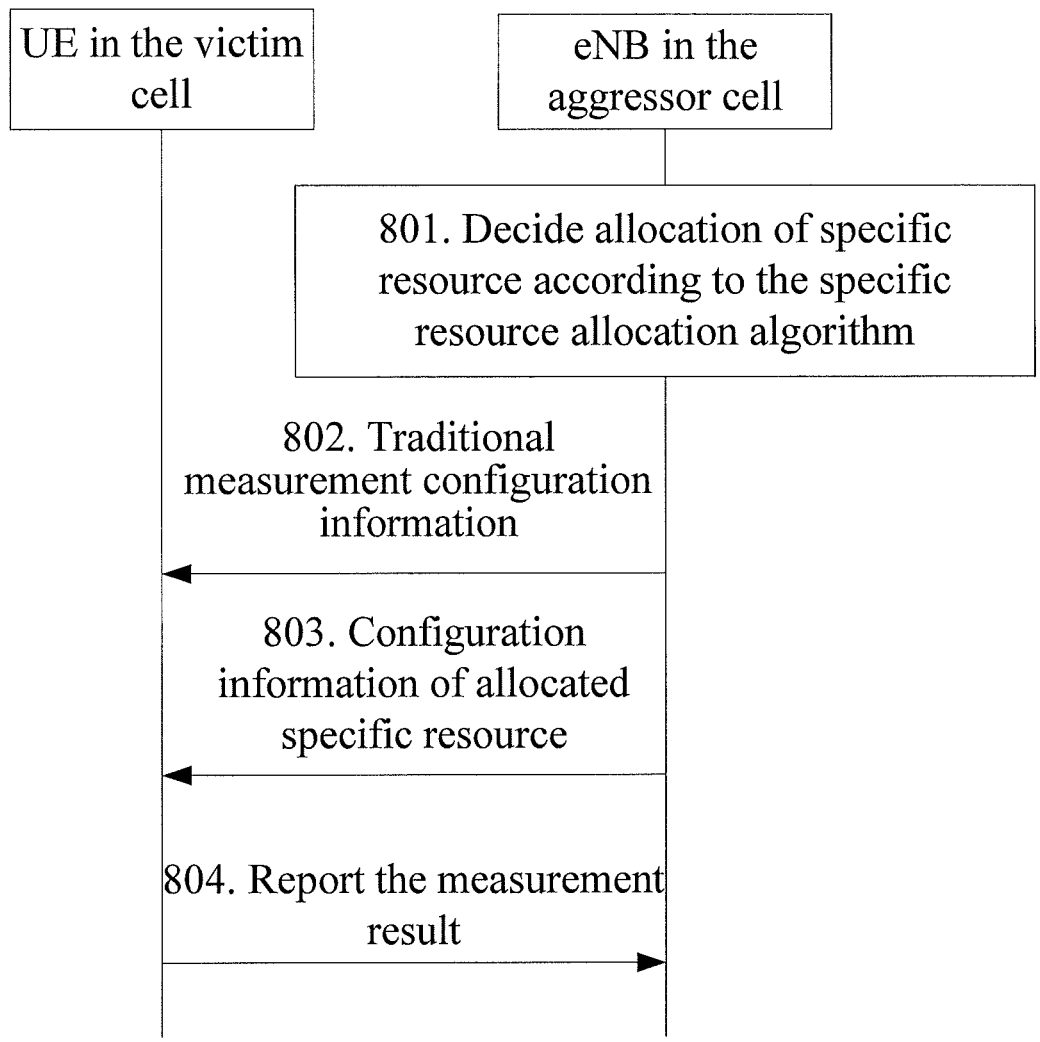
FIG. 8 is a signaling chart of how a UE in an aggressor cell reports a measurement result according to a first embodiment of the present invention.

FIG. 8 is a signaling chart of how a UE in an aggressor cell reports a measurement result according to a first embodiment of the present invention. The signaling flow includes:

801. The eNB of the aggressor cell decides allocation of specific resource according to the specific resource allocation algorithm.

802. The eNB of the aggressor cell sends the unrestrictive measurement configuration information to the UE.

803. The eNB of the aggressor cell sends configuration information of allocated specific resource of the eNB in this cell to the UE through a signaling. The network may decide whether to send the signaling to the UE according to the value, such as RSRQ-meas, representative of interference level, where the value representative of interference level is obtained through unrestrictive measurement performed by the UE.

After the UE receives the foregoing message, the RLM/CSI of the UE is measured according to specified resource block of specific resource. For the RRM measurement (such as RSRP/RSRQ), the UE performs only corresponding measurement according to specified resource block of specific resource, or performs measurement according to specified resource block of specific resource and unrestrictive measurement.

804. The UE reports the measurement result.

The UE reports only the measurement result of the measurement performed according to the specified resource block of specific resource. The measurement result may be identified by measurement type, or the result of measurement performed according to specified resource block of specific resource is identified by a new event type; or the UE reports the result of measurement performed according to specified resource block of specific resource and the result of unrestrictive measurement.

In this embodiment, the UE in the eNB of the aggressor cell reports the measurement result as a basis of handover; after receiving the measurement report from the UE, the eNB of the aggressor cell decides handover to the eNB of the victim cell.

Figure 9:
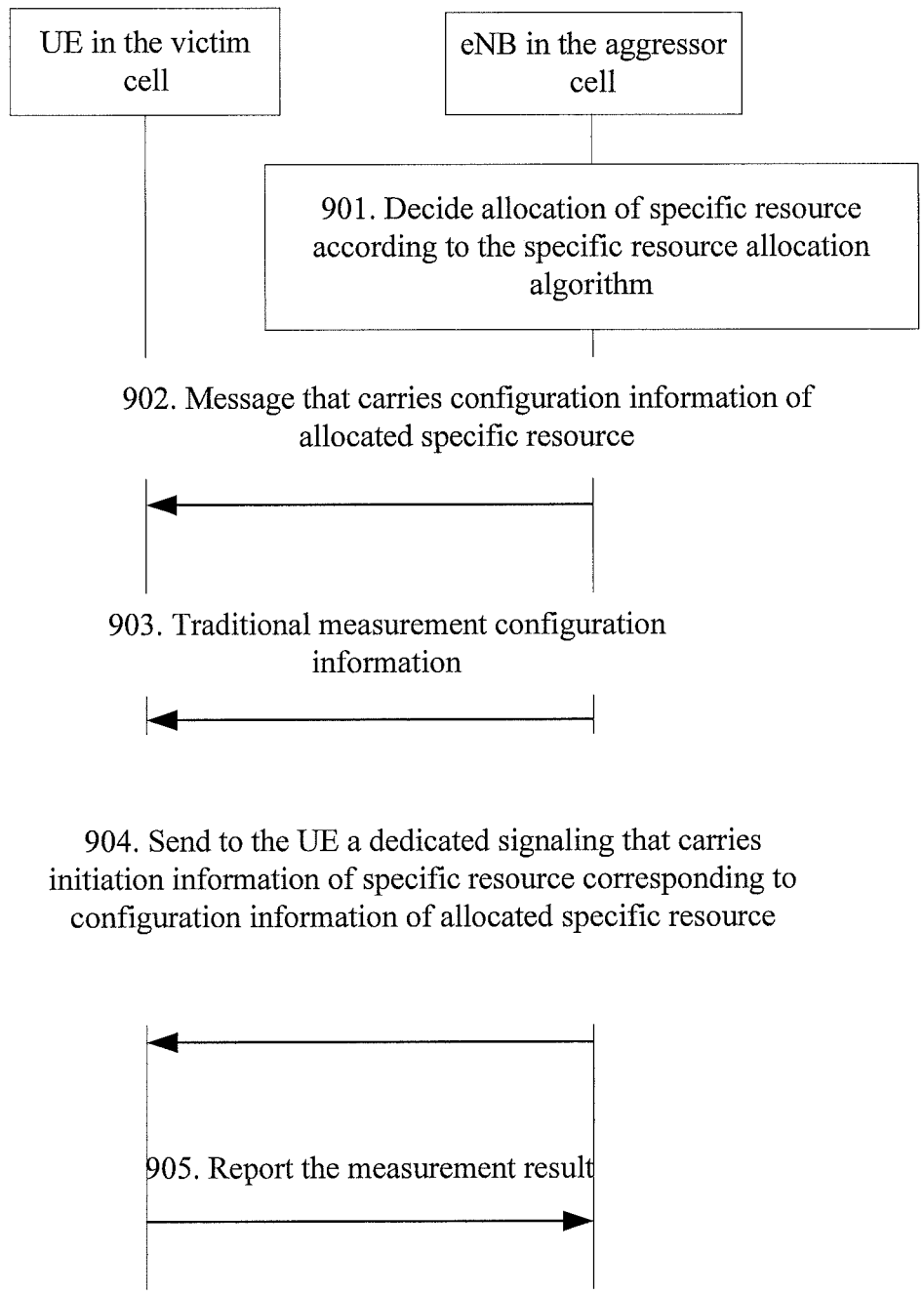
FIG. 9 is a signaling chart of how a UE in an aggressor cell reports a measurement result according to a second embodiment of the present invention.

FIG. 9 is a signaling chart of how a UE in an aggressor cell reports a measurement result according to a second embodiment of the present invention. The signaling flow includes:

901. The eNB of the aggressor cell decides allocation of specific resource according to the specific resource allocation algorithm.

902. A broadcast message is sent to the UE, where the broadcast message carries configuration information of allocated specific resource of the eNB of the aggressor cell.

903. The eNB of the aggressor cell sends the unrestrictive measurement configuration information to the UE.

904. For the UE that needs to perform measurement according to specified resource block of specific resource, the eNB of the aggressor cell sends measurement configuration information to the UE through a signaling. The measurement configuration information carries an indication of starting/stopping restrictive measurement and an indication of starting/stopping unrestrictive measurement; or carries an indication of starting/stopping restrictive measurement or an indication of starting/stopping unrestrictive measurement. By default, the UE performs only unrestrictive measurement. The network of the eNB of the aggressor cell may perform unrestrictive measurement according to the UE to obtain a value representative of interference level, for example, obtain an RSRQ-meas value as a basis for deciding whether to send a signaling to the UE.

As a step in place of step 904, configure the report type according to a measurement type indication included in the measurement configuration information unrestrictive measurement/restrictive measurement/both measurement or without the measurement type indication, meastype ENUMERATED {specificmeas, regularmeas, . . . , both}. By default, only unrestrictive measurement is performed.

If the signaling received by the UE indicates that both restrictive measurement and unrestrictive measurement are required, restrictive measurement according to specified resource block of specific resource and unrestrictive measurement is performed,; if restrictive measurement is configured for the UE, the measurement of RLM/CSI of the UE is only the measurement corresponding to the restrictive measurement.

905. The UE reports the measurement result.

The UE reports only the measurement result of the measurement performed according to the specified resource block of specific resource. The measurement result may be identified by measurement type, or the result of measurement performed according to specified resource block of specific resource is identified by a new event type; or the UE reports the result of measurement performed according to specified resource block of specific resource and the result of unrestrictive measurement.

In this embodiment, a specific UE of the eNB of the aggressor cell performs measurement upon receiving an initiation indication, and reports the measurement result as a basis of handover; after receiving the measurement report from the UE, the eNB of the aggressor cell decides handover to the eNB of the victim cell.

Figure 10:
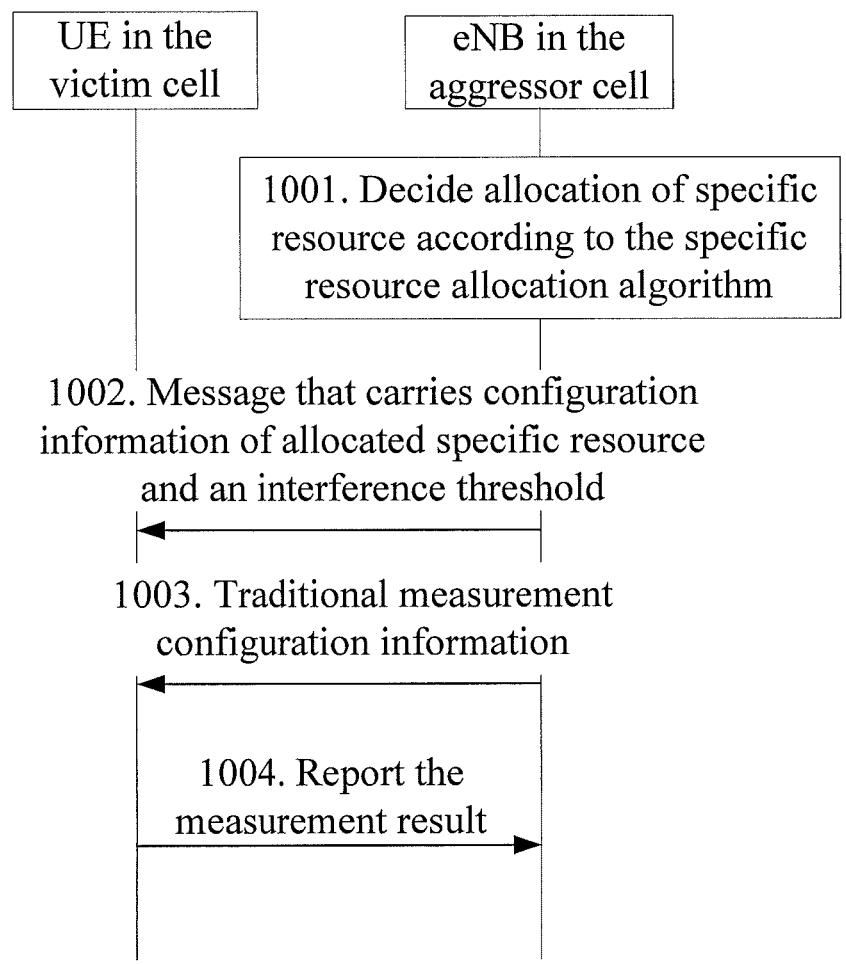
FIG. 10 is a signaling chart of how a UE in an aggressor cell reports a measurement result according to a third embodiment of the present invention.

FIG. 10 is a signaling chart of how a UE in an aggressor cell reports a measurement result according to a third embodiment of the present invention. The signaling flow includes:

1001. The eNB of the aggressor cell decides allocation of specific resource according to the specific resource allocation algorithm.

1002. A broadcast message is sent to the UE, where the broadcast message carries information about measurement resource of restrictive measurement of the eNB of the aggressor cell, and carries an interference threshold such as RSRQ-threshold.

The eNB of the aggressor cell may decide whether to send a signaling to the UE according to the value (such as RSRQ-meas) representative of interference level, where the value representative of interference level is obtained through unrestrictive measurement performed by the UE.

1003. The eNB of the aggressor cell sends the unrestrictive measurement configuration information to the UE.

When the UE reads the foregoing message, the restrictive resource configuration and the interference threshold continue to exist in the variables of the UE, and are updated after the restrictive resource configuration and the interference threshold is updated in the subsequent system message. The UE performs unrestrictive measurement to obtain a value representative of the interference level, for example, RSRQ-meas.

If the measured value RSRQ-meas is greater than or equal to the RSRQ-threshold, the UE still performs unrestrictive measurement; if the measured value RSRQ-meas is less than the RSRQ-threshold, the RLM/CSI of the UE is measured according to the specified resource block of specific resource. For the RRM measurement (such as RSRP/RSRQ), the UE performs only corresponding measurement according to specified resource block of specific resource, or performs measurement according to specified resource block of specific resource and unrestrictive measurement.

1004. The UE reports the measurement result.

The UE reports only the measurement result of the measurement performed according to the specified resource block of specific resource. The measurement result may be identified by measurement type, or the result of measurement performed according to specified resource block of specific resource is identified by a new event type; or the UE reports the result of measurement performed according to specified resource block of specific resource and the result of unrestrictive measurement.

In this embodiment, the UE in the eNB of the aggressor cell performs measurement by using an interference threshold, and reports the measurement result as a basis of handover; after receiving the measurement report from the UE, the eNB of the aggressor cell decides handover to the eNB of the victim cell.

Figure 11:
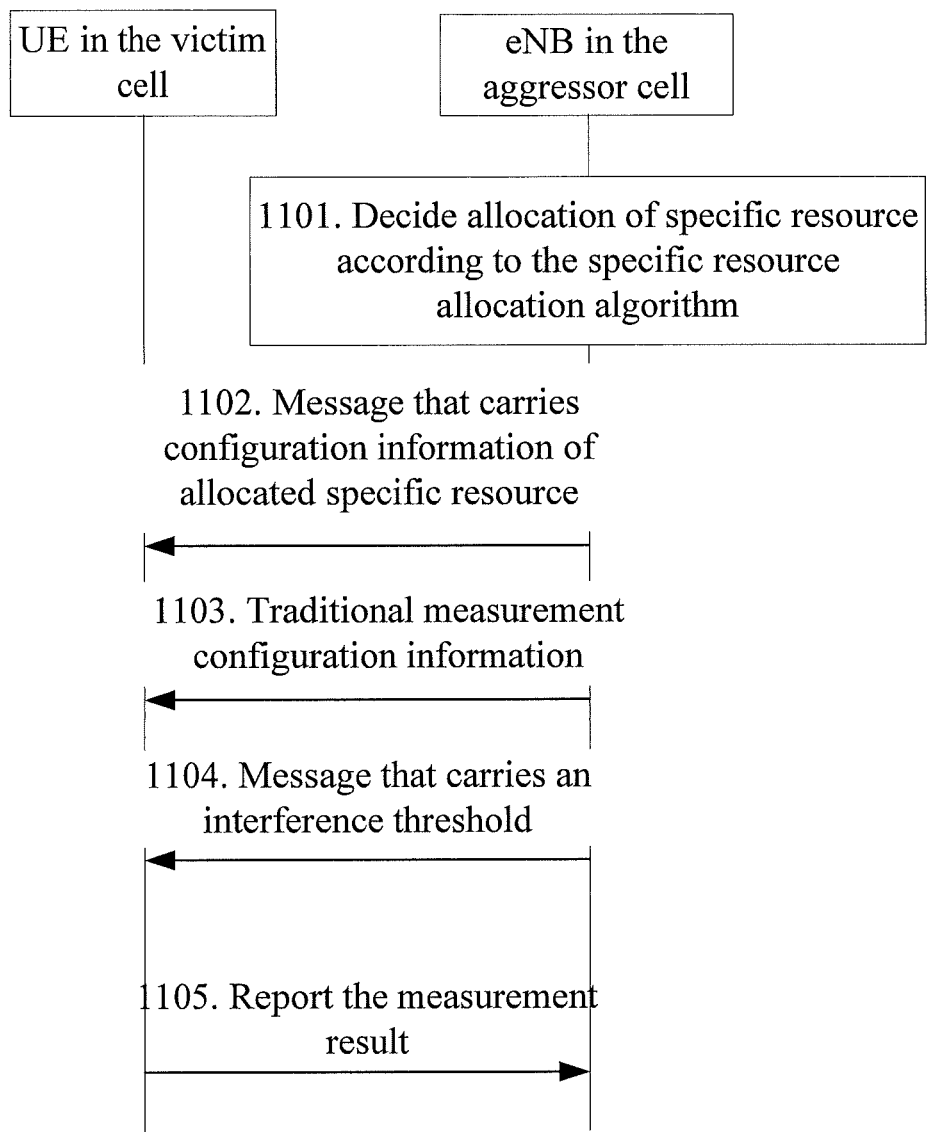
FIG. 11 is a signaling chart of how a UE in an aggressor cell reports a measurement result according to a fourth embodiment of the present invention.

FIG. 11 is a signaling chart of how a UE in an aggressor cell reports a measurement result according to a fourth embodiment of the present invention. The signaling flow includes:

1101. The eNB of the aggressor cell decides allocation of specific resource according to the specific resource allocation algorithm.

1102. A broadcast message is sent to the UE, where the broadcast message carries measurement resource information for restrictive measurement of the eNB of the aggressor cell.

1003. The eNB of the aggressor cell sends the unrestrictive measurement configuration information to the UE.

1104. The signaling sent by the eNB of the aggressor cell to the UE carries an interference threshold such as RSRQ-threshold.

The eNB of the aggressor cell may decide whether to send a signaling to the UE according to the value, such as RSRQ-meas representative of interference level, where the value representative of interference level is obtained through unrestrictive measurement performed by the UE. The interference may vary between different UEs.

When the UE reads the foregoing message, the restrictive resource configuration and the interference threshold continue to exist in the variables of the UE, and are updated after the restrictive resource configuration and the interference threshold is updated in the subsequent system message. If the UE receives an interference threshold such as RSRQ-threshold from the eNB of the victim cell, the UE performs unrestrictive measurement to obtain a value representative of the interference level, for example, RSRQ-meas.

If the measured value RSRQ-meas is greater than or equal to the RSRQ-threshold, the UE still performs unrestrictive measurement.

If the measured value "RSRQ-meas" is less than the RSRQ-threshold, the RLM/CSI of the UE is measured according to specified resource block of specific resource. For the RRM measurement (such as RSRP/RSRQ), the UE performs only corresponding measurement according to specified resource block of specific resource, or performs measurement according to specified resource block of specific resource and unrestrictive measurement.

1105. The UE reports the measurement result.

The UE reports only the measurement result of the measurement performed according to the specified resource block of specific resource. The measurement result may be identified by measurement type, or the result of measurement performed according to specified resource block of specific resource is identified by a new event type; or the UE reports the result of measurement performed according to specified resource block of specific resource and the result of unrestrictive measurement.

In this embodiment, a specific UE of the eNB of the aggressor cell performs measurement by using an interference threshold, and reports the measurement result as a basis of handover; after receiving the measurement report from the UE, the eNB of the aggressor cell decides handover to the eNB of the victim cell.

An embodiment of present invention provides a procedure about how a UE in an aggressor cell selects an eNB. The procedure includes: The eNB of the aggressor cell decides allocation of specific resource according to a specific resource allocation algorithm. A broadcast message is sent to the UE, where the broadcast message carries information about measurement resource of restrictive measurement of the eNB of the aggressor cell, and carries an interference threshold such as RSRQ-threshold. The network of the eNB of the aggressor cell may perform unrestrictive measurement according to the UE, and obtain a value representative of interference level, for example, RSRQ-meas. The eNB of the aggressor cell sends the unrestrictive measurement configuration information to the UE. When the UE reads the broadcast message, the measurement resource information for the restrictive measurement and the interference threshold continue to exist in the variables of the UE, and are updated after the restrictive resource configuration and the interference threshold is updated in the subsequent system message. The UE performs unrestrictive measurement to obtain a value representative of interference level, for example, RSRQ-meas. If the measured value RSRQ-meas is greater than or equal to the RSRQ-threshold, the UE still performs unrestrictive measurement; if the measured value RSRQ-meas is less than the RSRQ-threshold, the RSRQ of the UE is measured according to specified resource block of specific resource. While the UE reselects an eNB of the cell, the UE reports the result of measurement performed according to specified resource block of specific resource to the RRC layer, and evaluates criteria of selecting the eNB of the cell.

An embodiment of present invention provides a procedure about how a UE in a victim cell selects an eNB. The procedure includes: The eNB of the aggressor cell decides allocation of specific resource according to a specific resource allocation algorithm. The eNB of the aggressor cell exchanges configuration information of allocated specific resource with the eNB of the victim cell: The eNB of the victim cell sends a broadcast message to the UE, where the broadcast message carries the configuration information of allocated specific resource of the eNB of the aggressor cell as measurement resource information for restrictive measurement, and the broadcast message further carries an interference threshold such as RSRQ-threshold. The UE performs unrestrictive measurement, and obtains a value representative of the interference level, for example, RSRQ-meas. When the UE reads the broadcast message, the measurement resource information for the restrictive measurement and the interference threshold continue to exist in the variables of the UE, and are updated after the restrictive resource configuration and the interference threshold is updated in the subsequent system message. The UE performs unrestrictive measurement to obtain a value representative of interference level, for example, RSRQ-meas. If the measured value RSRQ-meas is greater than or equal to the RSRQ-threshold, the UE still performs unrestrictive measurement; if the measured value RSRQ-meas is less than the RSRQ-threshold, the RSRQ of the UE is measured according to specified resource block of specific resource. While the UE reselects an eNB of the cell, the UE reports the result of measurement performed according to specified resource block of specific resource to the RRC layer, and evaluates criteria of selecting the eNB of the cell. Criteria of selecting an eNB of the cell: The measurement resource information for restrictive measurement, which is obtained by the UE in the system message, may be resource used for ICIC or a subset of the resource, and an interference threshold such as RSRQ value. By default, the UE performs only unrestrictive measurement, and compares an interference value representative of an interference level with the interference threshold, where the interference value is obtained through unrestrictive measurement. If the interference value is greater than or equal to the interference threshold, the UE performs the corresponding unrestrictive measurement according to the measurement configuration information; if the interference value is less than the interference threshold, the UE initiates restrictive measurement according to configuration information of allocated specific resource. Alternatively, if the interference value is less than the interference threshold, the UE initiates restrictive measurement according to the configuration information of allocated specific resource, and continues the unrestrictive measurement at the same time until the interference value obtained in the unrestrictive measurement is greater than or equal to the interference threshold.

In the foregoing embodiment, the interfered UE can perform measurement accurately, and report the measurement result as a basis of handover. After receiving the measurement report, the eNB of the aggressor cell decides to hand over to the eNB of the victim cell. The handover command may optionally carry a notification to the eNB of the victim cell. The notification indicates that the mode of scheduling the UE is an enhanced scheduling mode of eICIC (namely, the scheduling is performed only on the resource designed for interference coordination on the eNB of the aggressor cell), or indicates that the measurement result serving as a basis of the decision derives from measurement of restrictive resource. The foregoing technical solution solves the following problems: When the UE suffers interference, the UE performs only unrestricted measurement (it is assumed that the quality of the measured cell is very low, and no eNB better than the eNB in the victim cell is available or the operator expects the UE to prefer the eNB in the victim cell), obtains a measurement result of the unrestricted measurement, and report the result. In this case, if the UE is located in the victim cell, the UE hands over futilely, or, if the UE measures only specific resource, the network is unable to perform interference coordination; if the UE is located in the eNB of the aggressor cell, the UE has no opportunity to hand over to the eNB in the victim cell, or, if the UE measures only specific resource, too many UEs hand over to the eNB of the victim cell, which leads to congestion of the eNB of the victim cell.

Figure 12:
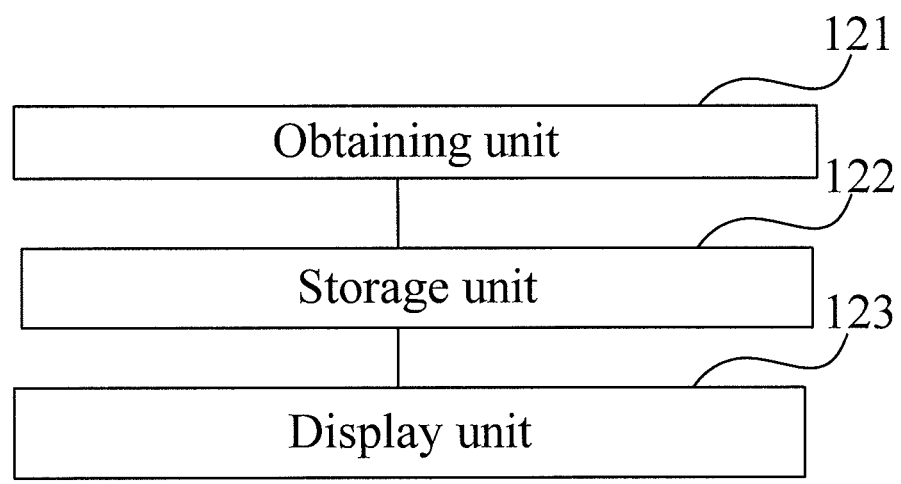
FIG. 12 is a schematic structure diagram of a measurement apparatus for interference coordination according to an embodiment of the present invention.

Corresponding to the foregoing method embodiment, a measurement apparatus for interference coordination is provided in an embodiment of the present invention. As shown in FIG. 12, the apparatus includes:

an obtaining unit 121, configured to obtain measurement configuration information, and obtain measurement resource information for restrictive measurement;

a measuring unit 122, configured to perform measurement according to the measurement configuration information and the measurement resource information for restrictive measurement, and obtain a measurement result; and a reporting unit 123, configured to report the measurement result.

Optionally, the obtaining unit 121 is specifically configured to obtain the measurement resource information for restrictive measurement, where the measurement resource information for restrictive measurement restricts the measured resource with respect to time domain, frequency domain, space domain, code domain; the measurement resource information for restrictive measurement indicates resource used for ICIC or a subset of the resource, and is obtained through a broadcast message or a signaling. The obtaining unit 121 is specifically configured to obtain the measurement configuration information, which includes: configuration information for unrestrictive measurement, and an indication of measuring specific resource corresponding to the measurement resource information for restrictive measurement, and an unrestrictive measurement indication; configuration information for unrestrictive measurement, and an indication of measuring specific resource corresponding to the measurement resource information for restrictive measurement, or an unrestrictive measurement indication; obtained through a broadcast message or a signaling; where the measurement indication includes starting, stopping. The obtaining unit 121 is specifically configured to obtain measurement configuration information, which includes: configuration information for unrestrictive measurement and a restrictive measurement indication, and an unrestrictive measurement indication for performing the corresponding type of measurement; configuration information for unrestrictive measurement and a restrictive measurement indication, or an unrestrictive measurement indication for performing the corresponding type of measurement; the obtained through a broadcast message or a signaling; where the measurement indication is an indication of starting, stopping. The measurement result obtained by the measuring unit 122 is identified by a measurement type or an event type.

Optionally, the obtaining unit 121 further obtains an interference threshold while obtaining the measurement resource information for restrictive measurement through a broadcast message or a signaling. Optionally, the measuring unit 122 is specifically configured to perform corresponding unrestrictive measurement according to the measurement configuration information, obtain an interference value representative of the interference level, and compare the interference value with the interference threshold; the measuring unit 122 performs corresponding unrestrictive measurement according to the measurement configuration information, obtain a measurement result of the unrestrictive measurement, and report the measurement result of the unrestrictive measurement to the base station of the serving cell if the interference value is greater than or equal to the interference threshold; the measuring unit 122 starts measurement of specific resource corresponding to the measurement resource information for restrictive measurement, and obtain a measurement result of the measurement of the specific resource if the interference value is less than the interference threshold, where the measurement result is reported by the reporting unit 123; or the measuring unit 122 performs corresponding unrestrictive measurement and obtains a measurement result of the unrestrictive measurement, and meanwhile, measures specific resource corresponding to the measurement resource information for restrictive measurement and obtains a result of the measurement of the specific resource, and the reporting unit 123 reports the result of the unrestrictive measurement and the result of measurement of the specific resource to the base station of the serving cell; or the measuring unit 122 performs corresponding unrestrictive measurement and obtains the result of the unrestrictive measurement, and meanwhile, measures the specific resource corresponding to the measurement resource information for restrictive measurement and obtains the result of the measurement of the specific resource, but the reporting unit 123 reports only the result of measurement of the specific resource to the base station of the serving cell until the interference value is greater than or equal to the interference threshold; start restrictive measurement as soon as the UE receives the measurement resource information for restrictive measurement, and meanwhile, continues the unrestrictive measurement.

Optionally, the obtaining unit 121 is specifically configured to obtain measurement configuration information from the base station of the victim cell through the UE located in the victim cell, and obtain the measurement resource information for restrictive measurement from the base station of the victim cell; or, the UE located in the aggressor cell obtains the measurement configuration information from the base station of the aggressor cell, and obtains the measurement resource information for restrictive measurement from the base station of the aggressor cell, wherein the measurement configuration information and the measurement resource information are applicable to measurement of neighboring victim cell. Optionally, after receiving the measurement result reported by the reporting unit 123, the base station of the aggressor cell decides to hand over to the base station of the victim cell according to the measurement result, and indicates a mode of scheduling the UE to the base station of the victim cell.

In the foregoing apparatus embodiment, the interfered UE can perform measurement accurately, and report the measurement result as a basis of handover. After receiving the measurement report, the eNB of the aggressor cell decides to hand over to the eNB of the victim cell. The handover command may optionally carry a notification to the eNB of the victim cell. The notification indicates that the mode of scheduling the UE is an enhanced scheduling mode of eICIC (namely, the scheduling is performed only on the resource designed for interference coordination on the eNB of the aggressor cell), or indicates that the measurement result serving as a basis of the decision derives from measurement of restrictive resource.

Figure 13:
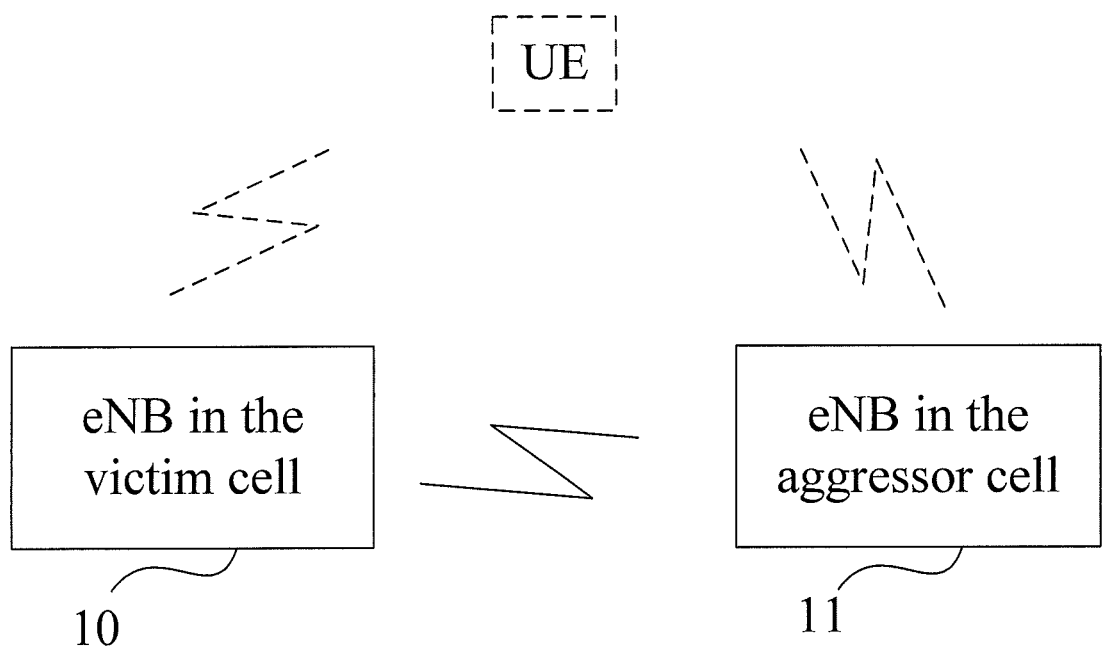
FIG. 13 is a schematic diagram of composition of a sending system for interference coordination according to an embodiment of the present invention.

Corresponding to the foregoing method embodiment and apparatus embodiment, a sending system for interference coordination is provided in an embodiment of the present invention. As shown in FIG. 13, the system includes an eNB 10 of a victim cell, and an eNB 11 of an aggressor cell. The eNB 10 of a victim cell is configured to send an eICIC request to the eNB 11 of an aggressor cell when the eNB 10 of the victim cell suffers interference from the eNB 11 of the aggressor cell; and the eNB 11 of the aggressor cell is configured to decide subframe configuration information applied to eICIC between the eNB 10 of the victim cell and the eNB 11 of the aggressor cell according to the eICIC request, and send the decided subframe configuration information as measurement resource information for restrictive measurement to the eNB 10 of the victim cell.

Optionally, the eNB 11 of the aggressor cell sends available subframe configuration information for eICIC to the eNB 10 of the victim cell before the eNB 10 of the victim cell sends the eICIC request to the eNB 11 of the aggressor cell. The eNB 11 of the aggressor cell is specifically configured to decide the subframe configuration information for eICIC applied between the eNB 10 of the victim cell and the eNB 11 of the aggressor cell, according to the subframe configuration information available to the eNB 11 of the aggressor cell for eICIC, and according to the eICIC subframe configuration information carried in the eICIC request.

Optionally, before the eNB 10 of the victim cell sends the eICIC request to the eNB 11 of the aggressor cell, a message is sent between the eNB 10 of the victim cell and the eNB 11 of the aggressor cell, where the message indicates local capability of eICIC to the opposite party. After the eNB 10 of the victim cell receives the subframe configuration information sent by the eNB 11 of the aggressor cell and decided for being applied to eICIC, the eNB 10 of the victim cell may send confirmed usable subframe configuration information for eICIC to the eNB 11 of the aggressor cell. The objective is to keep synchronization of using radio resource. If the eNB of the victim cell fails to receive the configuration information sent by the eNB of the aggressor cell, the eNB of the aggressor cell is unaware for lack of the confirmation, which leads to tremendous waste of radio resource.

When detecting that the measurement report submitted by the eNB 11 of the aggressor cell exceeds a preset threshold, the eNB 10 of the victim cell confirms that the eNB 10 of the victim cell suffers interference from the eNB 11 of the aggressor cell. The subframe configuration information decided for being applied to eICIC, which is sent by the eNB 11 of the aggressor cell to the eNB 10 of the victim cell, may include time of starting to use subframe configuration. The eICIC request sent by the eNB 10 of the victim cell to the eNB 11 of the aggressor cell carries an indication of interference level. The interference level may be of a high, medium or low level. Depending on the interference level, the eNB of the aggressor cell may reduce transmitting power or make the subframe be completely silent, so as to reduce interference.

In the foregoing system embodiment, the interfered UE can perform measurement accurately, and report the measurement result as a basis of handover. After receiving the measurement report, the eNB of the aggressor cell decides to hand over to the eNB of the victim cell. The handover command may optionally carry a notification to the eNB of the victim cell. The notification indicates that the mode of scheduling the UE is an enhanced scheduling mode of eICIC (namely, the scheduling is performed only on the resource designed for interference coordination on the eNB of the aggressor cell), or indicates that the measurement result serving as a basis of the decision derives from measurement of restrictive resource.

Persons of ordinary skill in the art should understand that all or part of the steps of the method specified in any embodiment above may be implemented by a program instructing relevant hardware. The program may be stored in computer readable storage media such as ROM/RAM, magnetic disk or CD-ROM. When the program runs, the program performs all or part of the steps described above.

Disclosed above are the objectives, technical solution and benefits of the embodiments of the present invention. Although the invention has been described through some exemplary embodiments, the invention is not limited to such embodiments. It is apparent that those skilled in the art can make modifications and variations to the invention without departing from the spirit and scope of the invention. The invention is intended to cover the modifications and variations provided that they fall in the scope of protection defined by the following claims or their equivalents.

What is claimed is:

1. A method for measurement of interference coordination, comprising:
  receiving, by a user equipment in an aggressor cell from a base station of the aggressor cell, measurement configuration information and measurement resource information for restrictive measurement, wherein the measurement resource information for restrictive measurement indicates a radio resource management (RRM) measurement of a neighboring victim cell to be performed during a time subset of restricted time resources used for Inter-Cell Interference Coordination (ICIC);
  performing, by the user equipment, corresponding unrestrictive measurement according to the measurement configuration information, and obtaining an interference value representative of an interference level;
  performing, by the user equipment, the RRM measurement of the neighboring victim cell during the time subset if the interference value is greater than an interference threshold; and
  transmitting, by the user equipment, an RRM measurement result to the base station of the aggressor cell, wherein the RRM measurement result is obtained from the RRM measurement.

2. The method according to claim 1, wherein the measurement resource information for restrictive measurement comprises subframe configuration information applied to enhanced Inter-Cell Interference Coordination (eICIC) used in Time Division Multiplex (TDM).

3. The method according to claim 1, wherein receiving the measurement configuration information comprises:
  obtaining configuration information of unrestrictive measurement and a measurement type indication; and
  wherein the measurement type indication indicates to perform the RRM measurement by using a measurement indication of using specific resource corresponding to measurement resource information for restrictive measurement, and indicates to perform the RRM measurement by using a measurement indication of performing unrestrictive measurement.

4. The method according to claim 1, wherein receiving the measurement configuration information comprises:
  obtaining configuration information for unrestrictive measurement and indication of starting and stopping measurement; and
  wherein the indication of starting and stopping measurement indicates to start and stop restrictive measurement, or indicates to start and stop unrestrictive measurement.

5. An apparatus in an aggressor cell for interference coordination, comprising:
  a receiver, configured to receive measurement configuration information and measurement resource information for restrictive measurement from a base station of the aggressor cell, wherein the measurement resource information for restrictive measurement indicates a radio resource management (RRM) measurement of a neighboring victim cell to be performed during a time subset of restricted time resources used for Inter-Cell Interference Coordination (ICIC);
  a processor, configured to perform corresponding unrestrictive measurement according to the measurement configuration information, obtain an interference value representative of an interference level, and perform the RRM measurement of the neighboring victim cell during the time subset if the interference value is greater than an interference threshold;
  a transmitter, configured to transmit an RRM measurement result to the base station of the aggressor cell, wherein the RRM measurement result is obtained from the RRM measurement.

6. The apparatus according to claim 5, wherein:
  the measurement resource information for restrictive measurement comprises subframe configuration information applied to enhanced Inter-Cell Interference Coordination (eICIC) used in Time Division Multiplex (TDM).

7. The apparatus according to claim 5, wherein the receive measurement configuration information comprises:
  obtain configuration information of unrestrictive measurement and a measurement type indication; and
  wherein the measurement type indication indicates to perform the RRM measurement by using a measurement indication of using specific resource corresponding to measurement resource information for restrictive measurement, and indicates to perform the RRM measurement by using a measurement indication of performing unrestrictive measurement.

8. The apparatus according to claim 5, wherein the receive measurement configuration information comprises:
obtain configuration information for unrestrictive measurement and indication of starting and stopping measurement; and
wherein the indication of starting and stopping measurement indicates to start and stop restrictive measurement, or indicates to start and stop unrestrictive measurement.

* * * * *